(12) United States Patent
Hwang et al.

(10) Patent No.: US 11,283,714 B2
(45) Date of Patent: *Mar. 22, 2022

(54) TRANSMITTING APPARATUS, RECEIVING APPARATUS AND CONTROLLING METHOD THEREOF

(71) Applicant: SAMSUNG ELECTRONICS CO., LTD., Suwon-si (KR)

(72) Inventors: Sung-hee Hwang, Suwon-si (KR); Hak-ju Lee, Seoul (KR); Hyun-Koo Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

This patent is subject to a terminal disclaimer.

(21) Appl. No.: 16/809,003

(22) Filed: Mar. 4, 2020

(65) Prior Publication Data

US 2020/0204491 A1 Jun. 25, 2020

Related U.S. Application Data

(63) Continuation of application No. 16/221,655, filed on Dec. 17, 2018, now Pat. No. 10,616,107, which is a
(Continued)

(30) Foreign Application Priority Data

Nov. 11, 2015 (KR) .................. 10-2015-0158268

(51) Int. Cl.
*H04L 1/00* (2006.01)
*H04L 45/74* (2022.01)
(Continued)

(52) U.S. Cl.
CPC ............... *H04L 45/74* (2013.01); *H04L 1/00* (2013.01); *H04L 1/0083* (2013.01); *H04L 5/00* (2013.01);
(Continued)

(58) Field of Classification Search
CPC .................................. H04L 45/74; H04L 1/00
See application file for complete search history.

(56) References Cited

U.S. PATENT DOCUMENTS 6,542,504 B1    4/2003    Mahler et al.
8,891,465 B2    11/2014   Park et al.
(Continued)

FOREIGN PATENT DOCUMENTS

CN    101415276 A    4/2009
CN    102215425 A    10/2011
(Continued)

OTHER PUBLICATIONS

Communication dated Feb. 28, 2020 by the India Patent Office for Indian Patent Application No. 201717014812.
(Continued)

*Primary Examiner* — Sulaiman Nooristany
(74) *Attorney, Agent, or Firm* — Sughrue Mion, PLLC

(57) ABSTRACT

Provided are a transmitting apparatus, a receiving apparatus and controlling methods thereof. The transmitting apparatus includes: at least one processor configured to implement a packet generator which generates a packet including a header and a payload based on a plurality of input packets; and a signal processor which signal-processes the generated packet, and a transmitter configured to transmit the signal-processed packet. A base field included in the header includes a first field set to a first value representing that the base field is a first length or a second value representing that the base field is a second length.

12 Claims, 39 Drawing Sheets

Related U.S. Application Data continuation of application No. 14/938,116, filed on Nov. 11, 2015, now Pat. No. 10,193,803.

(60) Provisional application No. 62/151,654, filed on Apr. 23, 2015, provisional application No. 62/077,970, filed on Nov. 11, 2014.

(51) Int. Cl.
   *H04L 69/22* (2022.01)
   *H04L 69/10* (2022.01)
   *H04L 5/00* (2006.01)
   *H04L 27/26* (2006.01)

(52) U.S. Cl.
   CPC .............. *H04L 69/10* (2013.01); *H04L 69/22* (2013.01); *H04L 1/0041* (2013.01); *H04L 1/0045* (2013.01); *H04L 5/0023* (2013.01); *H04L 5/0094* (2013.01); *H04L 27/2601* (2013.01); *H04L 2001/0093* (2013.01)

(56) References Cited

U.S. PATENT DOCUMENTS

| | | |
|---|---|---|
| 2003/0206605 A1 | 11/2003 | Anderson |
| 2004/0148382 A1 | 7/2004 | Narad et al. |
| 2008/0192726 A1 | 8/2008 | Mahesh et al. |
| 2008/0240097 A1 | 10/2008 | Kim et al. |
| 2009/0034526 A1 | 2/2009 | Ahmadi et al. |
| 2010/0027566 A1 | 2/2010 | Kim et al. |
| 2011/0255626 A1 | 10/2011 | Kim et al. |
| 2012/0063407 A1 | 3/2012 | Park et al. |
| 2012/0281699 A1 | 11/2012 | Jia et al. |
| 2017/0126558 A1* | 5/2017 | Kwon .................. H04H 60/07 |

FOREIGN PATENT DOCUMENTS

| | | |
|---|---|---|
| CN | 102301701 A | 12/2011 |
| CN | 102301703 A | 12/2011 |
| CN | 102439967 A | 5/2012 |
| EP | 1 103 114 B1 | 11/2008 |
| KR | 10-2006-0123274 A | 12/2006 |
| KR | 10-2010-0083747 A | 7/2010 |
| KR | 10-2013-0110201 A | 10/2013 |
| WO | 2005/060594 A2 | 7/2005 |
| WO | 2010/087554 A1 | 8/2010 |
| WO | 2010/087555 A1 | 8/2010 |
| WO | 2012/091371 A1 | 7/2012 |
| WO | 2013/055176 A1 | 4/2013 |

OTHER PUBLICATIONS

Communication dated Aug. 19, 2020 issued by the Brazilian Intellectual Property Office in counterpart Brazilian Application No. BR112017009808-3.

Communication dated Sep. 25, 2020 issued by the European Intellectual Property Office in counterpart European Application No. 15 859 403.6.

Communication issued by the European Patent Office dated Oct. 4, 2017 in counterpart European Patent Application No. 15859403.6.

Notice of Allowance dated Dec. 4, 2018 by the Korean Intellectual Property Office in counterpart Korean Patent Application No. 10-2018-0119560.

International Search Report dated Mar. 2, 2016 issued by International Searching Authority in counterpart International Application No. PCT/KR2015/012131 (PCT/ISA/210).

Written Opinion dated Mar. 2, 2016 issued by International Searching Authority in counterpart International Application No. PCT/KR2015/012131 (PCT/ISA/237).

Communication dated Aug. 18, 2021, from the European Patent Office in European Application No. 15859403.6.

Communication dated Nov. 4, 2021, from the Canadian Intellectual Property Office in Application No. 3040597.

Communication dated Sep. 2, 2021, from The China National Intellectual Property Administration in Application No. 201580061292.2.

Huamei Li et al., "Discussion of Safety of 1Pv6 Technology in Hierarchical Protection System", Electronic Technology and Software Engineering, Nov. 1, 2013, No. 21, p. 62 (1 page total).

\* cited by examiner

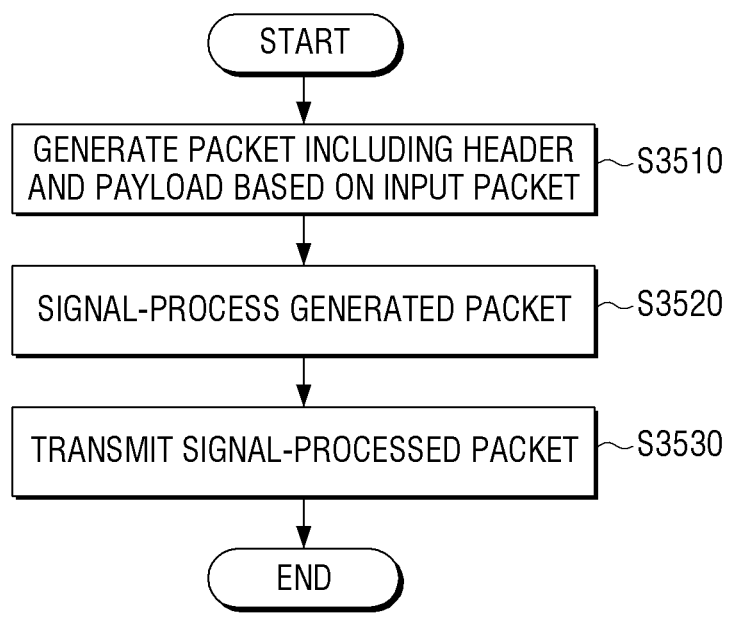

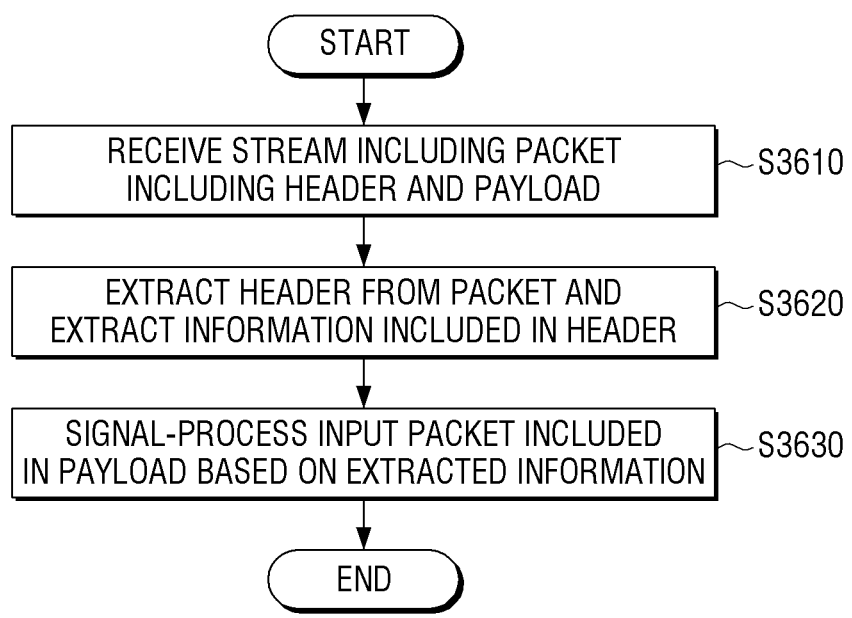

TRANSMITTING APPARATUS, RECEIVING APPARATUS AND CONTROLLING METHOD THEREOF

CROSS-REFERENCE TO THE RELATED APPLICATIONS

This application is a continuation of U.S. application Ser. No. 16/221,655 filed Dec. 17, 2018 which is a continuation of U.S. patent application Ser. No. 14/938,116, filed Nov. 11, 2015 which is now U.S. Pat. No. 10,193,803 issued Jan. 29, 2019, which claims priority from U.S. Provisional Patent Application Nos. 62/077,970 and 62/151,654, filed on Nov. 11, 2014 and Apr. 23, 2015, respectively, in the U.S. Patent Trademark Office, and Korean Patent Application No. 10-2015-0158268, filed on Nov. 11, 2015, in the Korean Intellectual Property Office, the disclosures of which are incorporated herein by reference in their entirety.

BACKGROUND

1. Field

Apparatuses and methods consistent with the exemplary embodiments relate to a transmitting apparatus, a receiving apparatus, and a signaling method thereof, which transmit data by mapping the data to at least one signal processing path.

2. Description of the Related Art

In the information-oriented society of the $21^{st}$ century, broadcasting communication services are entering an era of digitization, multi-channel, broadband, and high quality. In particular, as high-quality digital television (TV), portable multimedia players (PMP), and portable broadcasting apparatuses have been increasingly used in recent years, even in digital broadcasting services, a demand for supporting various receiving methods has been increased.

In an actual state in which the standard group has established various standards according to demands to provide various services to satisfy user's needs, it is required to find methods for providing better services having improved performance.

SUMMARY

Exemplary embodiments may overcome the above disadvantages and other disadvantages not described above. However, the exemplary embodiments are not required to overcome the disadvantages described above, and may not overcome any of the problems described above.

The exemplary embodiments provide a transmitting apparatus, a receiving apparatus, and a control method, capable of generating a frame having a format suitable for transmitting various types of data.

According to an aspect of an exemplary embodiment, there is provided a transmitting apparatus which may include: at least one processor configured to implement a packet generator generating a packet including a header and a payload based on a plurality of input packets, and a signal processor signal-processing the generated packet; and a transmitter configured to transmit the signal-processed packet. A base field included in the header includes a first field set to a first value representing that the base field is a first length or a second value representing that the base field is a second length. When the first field is set to the second value, the base field comprises a second field representing least significant bits (LSB) of the pointer value indicating a first start point among respective start points of the input packets included in the payload and a third field representing most significant bits (MSB) of the pointer value.

Here, the base field comprises a fourth field representing an extension mode of the header, and the fourth field comprises at least one of information about whether an optional field is present, a length of the optional field, and a structure of an extension field.

Further, the fourth field is set to one of a third value representing that the optional field and the extension field are not present, a fourth value representing that the optional field is present and a length of the optional field is 1 byte, a fifth value representing that the optional field is present and the length of the optional field is 2 bytes, and a sixth value representing the optional field is present, the length of the optional field is 2 bytes, and the extension field has a structure comprising a plurality of extension payloads.

Further, when the fourth field is set to the fourth value or the fifth value, the optional field further includes a fifth field representing a type of extension payload included in the extension field and a sixth field representing a length of the extension field, and when the fifth field is set to the predetermined value, the extension field is completely filled padding.

Further, when the fourth field is set to the fifth value, the optional field comprises a field representing a type of an extension payload included in the extension field, a field representing an LSB part of a length of the extension field, and a field representing an MSB part of the length of the extension field.

Further, when the fourth field is set to the sixth value, the optional field comprises a field representing a number of a plurality of extension payloads included in the extension field, a field representing an LSB part of a length of the extension field, and a field representing an MSB part of the length of the extension field.

Further, the extension field comprises a plurality of fields representing respective types of the plurality of extension payloads and a plurality of fields representing respective lengths of the plurality of extension payloads.

Further, when the fourth field is set to one of a fourth value and a fifth value and a length of an extension payload included in the extension field is smaller than a length of the extension field, the extension field comprises the extension payload and padding.

Further, when the fourth field is set to a sixth value, the extension field comprises a plurality of extension payloads and padding.

According to another aspect of an exemplary embodiment, there is provided a receiving apparatus which may include: a receiver configured to receive a stream including a packet including a header and a payload; and at least one processor configured to implement an information extractor extracting the header from the packet and extract information included in the header, and a signal processor signal-processing a plurality of input packets included in the payload based on the extracted information. A base field included in the header includes a first field set to a first value representing that the base field is a first length or a second value representing that the base field is a second length. When the first field is set to the second value, the base field comprises a second field representing least significant bits (LSB) of the pointer value indicating a first start point among respective start points of the input packets included in the payload and a third field representing most significant bits (MSB) of the pointer value.

According to yet another aspect of an exemplary embodiment, there is provided a controlling method of a transmitting apparatus which may include: generating a packet including a header and a payload based on a plurality of input packets; signal-processing the generated packet; and transmitting the signal-processed packet. A base field included in the header includes a first field set to a first value representing that the base field is a first length or a second value representing that the base field is a second length. When the first field is set to the second value, the base field comprises a second field representing least significant bits (LSB) of the pointer value indicating a first start point among respective start points of the input packets included in the payload and a third field representing most significant bits (MSB) of the pointer value.

Further, the base field comprises a fourth field representing an extension mode of the header, and the fourth field comprises at least one of information about whether an optional field is present, a length of the optional field, and a structure of an extension field.

Further, the fourth field is set to one of a third value representing that the optional field and the extension field are not present, a fourth value representing that the optional field is present and a length of the optional field is 1 byte, a fifth value representing that the optional field is present and the length of the optional field is 2 bytes, and a sixth value representing the optional field is present, the length of the optional field is 2 bytes, and the extension field has a structure comprising a plurality of extension payloads.

Further, when the fourth field is set to the fourth value or the fifth value, the optional field further includes a fifth field representing a type of extension payload included in the extension field and a sixth field representing a length of the extension field, and when the fifth field is set to the predetermined value, the extension field is completely filled by padding.

Further, when the fourth field is set to the fifth value, the optional field comprises a field representing a type of an extension payload included in the extension field, a field representing an LSB part of a length of the extension field, and a field representing an MSB part of the length of the extension field.

Further, when the fourth field is set to the sixth value, the optional field comprises a field representing a number of a plurality of extension payloads included in the extension field, a field representing an LSB part of a length of the extension field, and a field representing an MSB part of the length of the extension field.

Further, the extension field comprises a plurality of fields representing respective types of the plurality of extension payloads and a plurality of fields representing respective lengths of the plurality of extension payloads.

Further, when the fourth field is set to one of a fourth value and a fifth value and a length of an extension payload included in the extension field is smaller than a length of the extension field, the extension field comprises the extension payload and padding.

Further, when the fourth field is set to a sixth value, the extension field comprises a plurality of extension payloads and padding.

According to still another aspect an exemplary embodiment, there is provided a controlling method of a receiving apparatus which may include: receiving a stream including a packet including a header and a payload; extracting the header from the packet and extracting information included in the header; and signal-processing a plurality of input packets included in the payload based on the extracted information. A base field included in the header includes a first field set to a first value representing that the base field is a first length or a second value representing that the base field is a second length. The header may include a first field which is set to a first value representing that a pointer value indicating a first start point among respective start points of the input packets included in the payload is less than a predetermined value or a second value representing that the pointer value is equal to or greater than the predetermined value. When the first field is set to the second value, the base field comprises a second field representing least significant bits (LSB) of the pointer value indicating a first start point among respective start points of the input packets included in the payload and a third field representing most significant bits (MSB) of the pointer value.

According to the exemplary embodiments, since an input stream can be efficiently mapped to a physical layer, data processing efficiency can be improved.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWINGS

The above and/or other aspects will be more apparent by describing certain exemplary embodiments with reference to the accompanying drawings, in which:

FIG. 30 is a flowchart for describing a control method of a transmitting apparatus, according to an exemplary embodiment; and FIG. 31 is a flowchart for describing a control method in a receiving apparatus, according to an exemplary embodiment.

DETAILED DESCRIPTION OF THE EXEMPLARY EMBODIMENTS

Hereinafter, various exemplary embodiments of the inventive concept will be described in detail with reference to the accompanying drawings. Further, in the following description, a detailed explanation of known related functions or configurations may be omitted to avoid unnecessarily obscuring the subject matter. In addition, terms to be described below may vary according to a user's and an operator's intentions, the convention, or the like as terms defined by considering functions. Therefore, the definition should be made according to the contents throughout this specification.

An apparatus and a method proposed in the exemplary embodiments can be, of course, applied to various communication systems including mobile broadcasting services including a digital multimedia broadcasting (DMB) service, digital video broadcasting handheld (DVP-H), an advanced television systems committee mobile/handheld (ATSC-M/H) service, an Internet protocol television (IPTV), and the like, communication systems including a moving picture experts group (MPEG) media transport (MMT) system, an evolved packet system (EPS), a long-terms evolution (LTE) mobile communication system, a long-term evolution-advanced (LTE-A) mobile communication system, a high speed downlink packet access (HDSPA) mobile communication system, a high speed uplink packet access (HSUPA) mobile communication system, a $3^{rd}$ generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
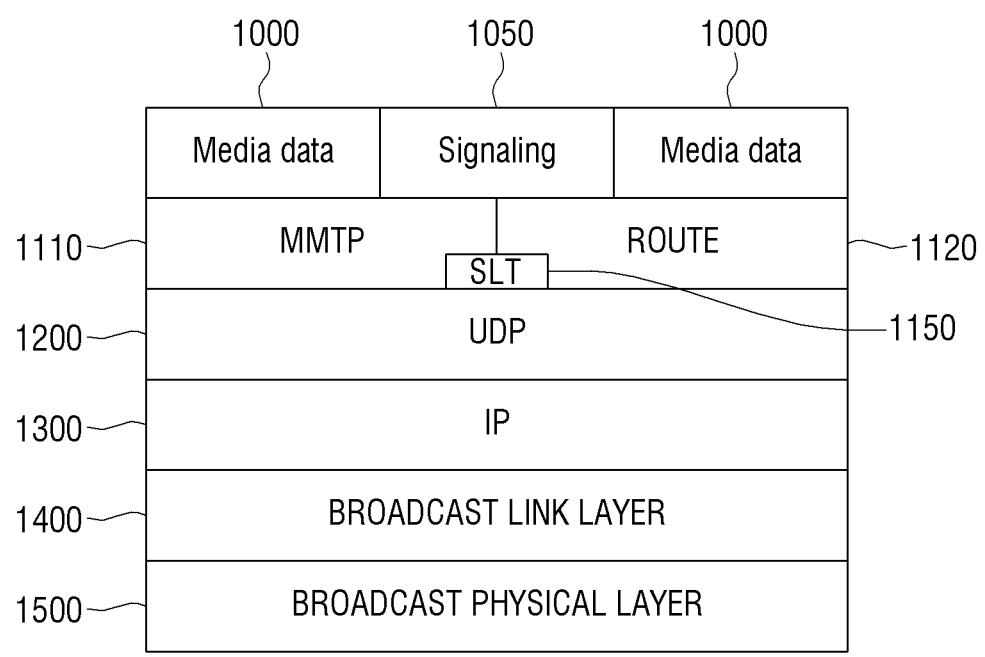
FIG. 1 is a diagram for describing a hierarchical structure of a transmitting system, according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application protocol, in which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-TS packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting-Second Generation Terrestrial (DVB-T2) standard, and one or more services or some of the services may be mapped to the PLP.

Figure 2:
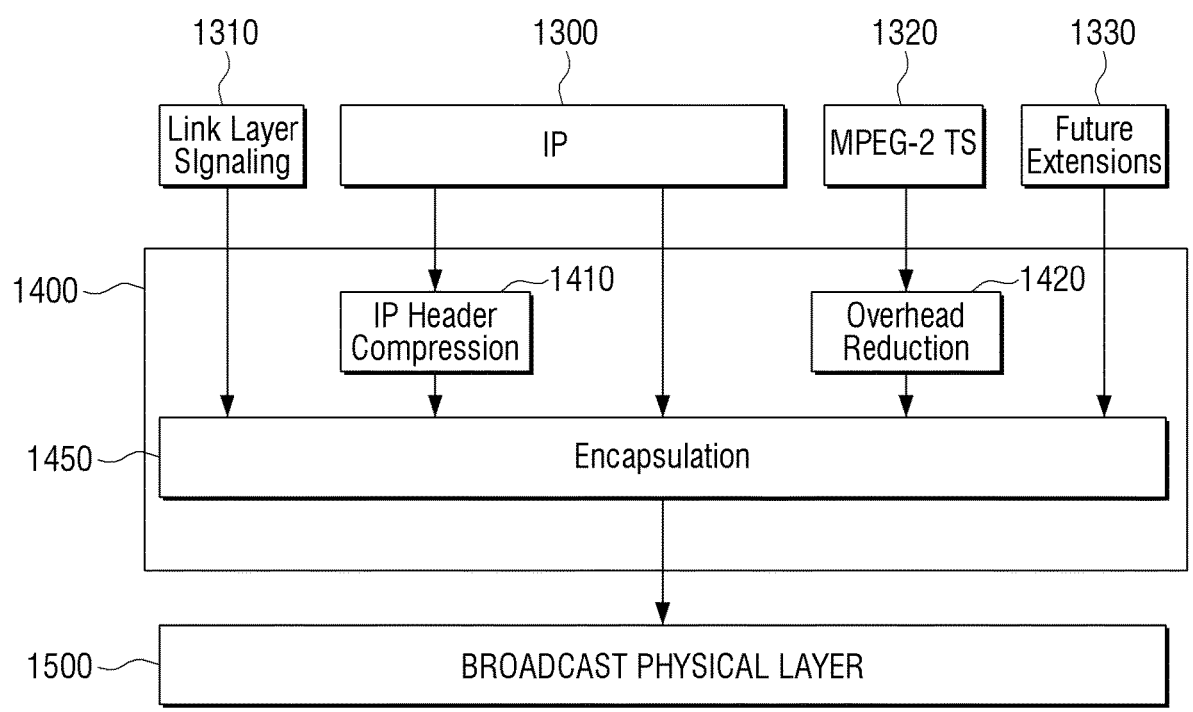
FIG. 2 is a diagram illustrating a schematic configuration of a broadcast link layer 1400, according to an exemplary embodiment.

FIG. 2 is a diagram illustrating a schematic configuration of the broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
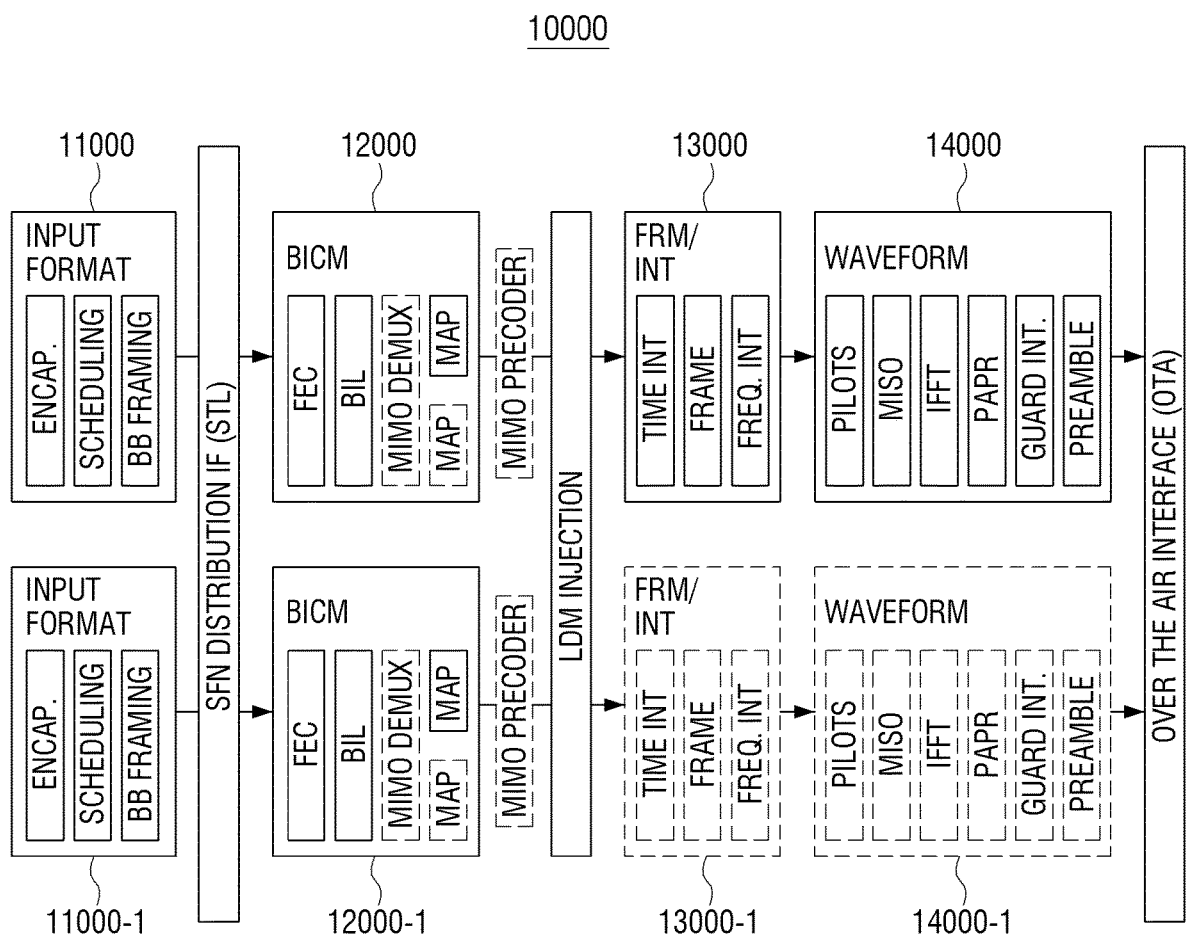
FIG. 3A is a diagram for describing a schematic configuration of a transmitting system, according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) to which the data to be serviced will be transmitted, and perform encoding and time interleaving. Meanwhile, signaling information about the data to be serviced may be encoded through a separate BICM encoder according to user implementation or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an orthogonal frequency-division multiplexing (OFDM) signal in a time domain for the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
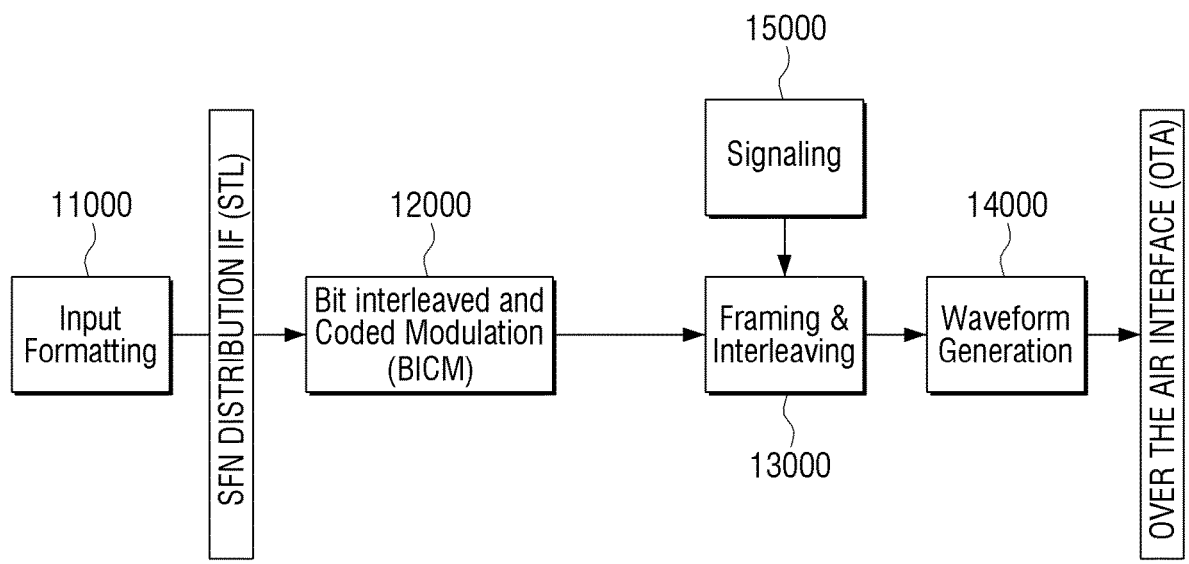
FIGS. 3B and 3C are diagrams for describing a multiplexing method, according to exemplary embodiments.
Figure 3C:
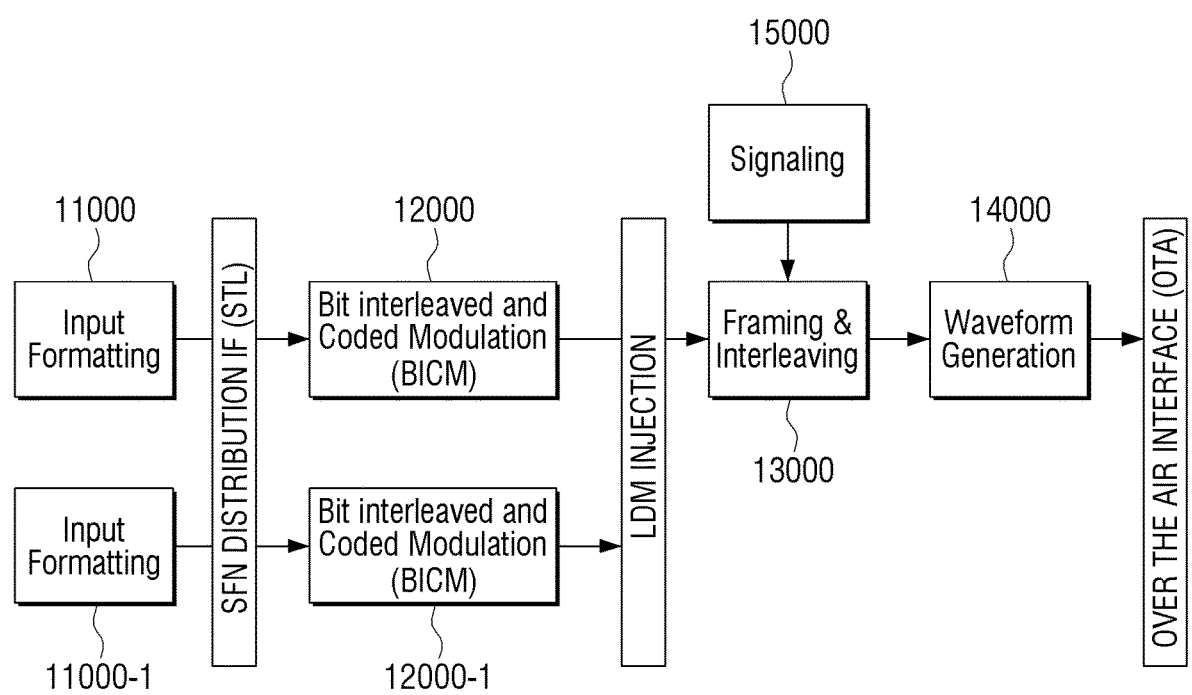

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BCIM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
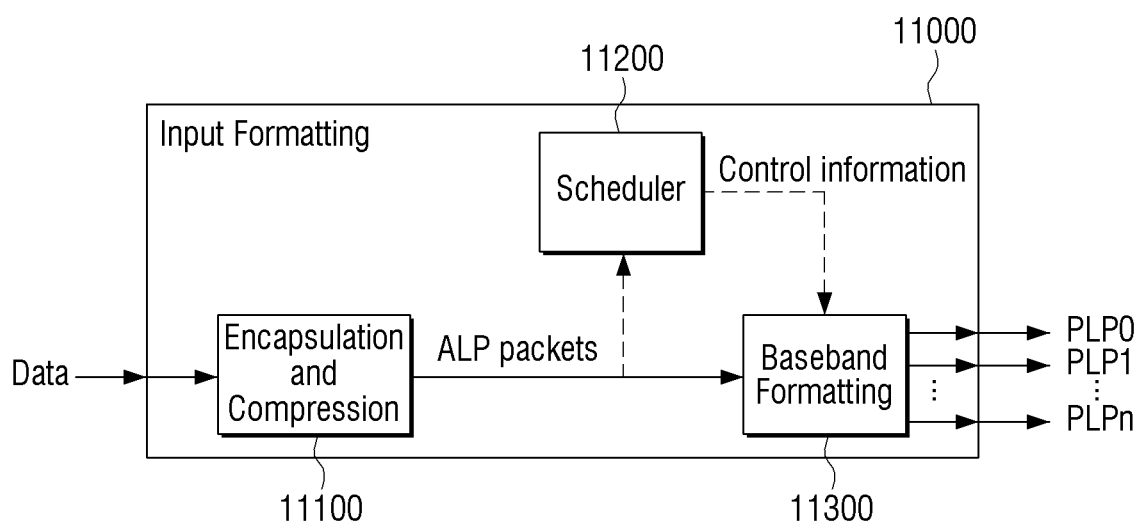
FIG. 4 is a block diagram illustrating a detailed configuration of an input formatting block illustrated in FIG. 3A, according to an exemplary embodiment.

FIG. 4 is a block diagram illustrating a detailed configuration of the input formatting block illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
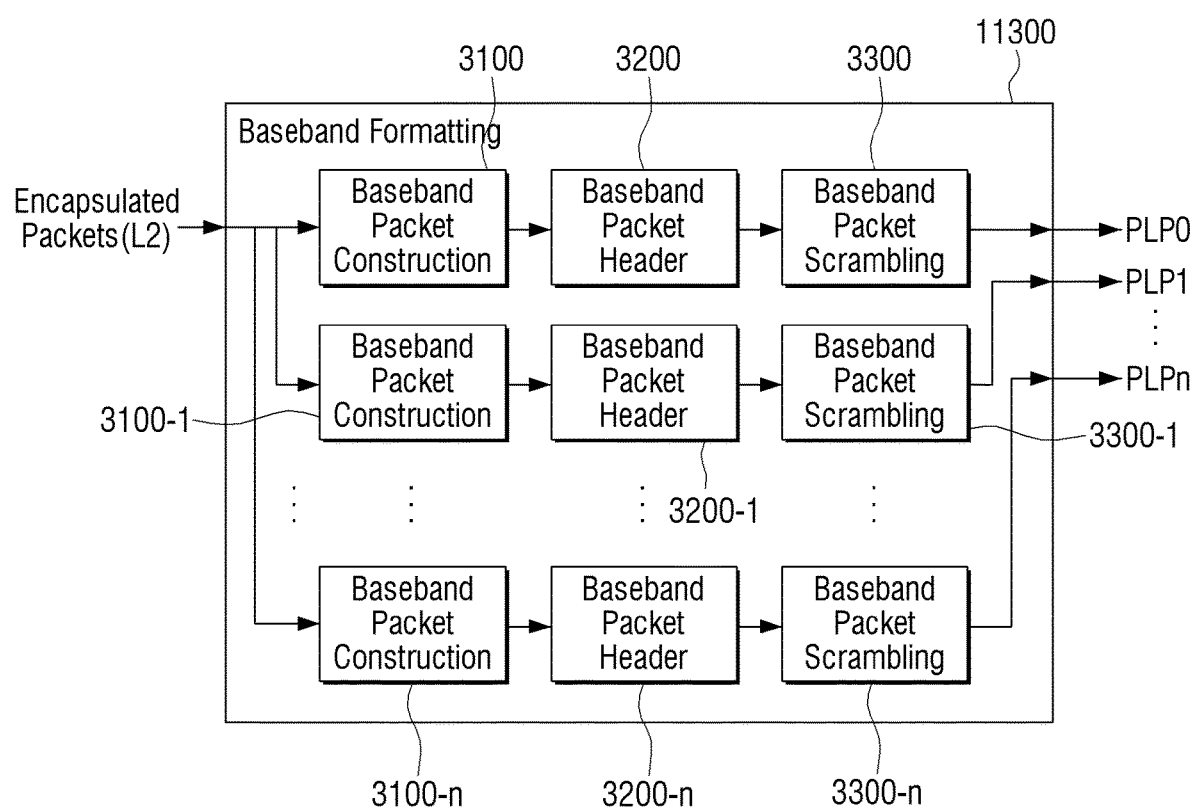
FIG. 5A is a block diagram illustrating a configuration of a baseband formatting block, according to an exemplary embodiment.

The baseband formatting block 11300 includes baseband packet construction blocks 3100, 3100-1, . . . 3100-n, baseband packet header construction blocks 3200, 3200-1, . . . , 3200-n, and baseband packet scrambling blocks 3300, 3300-1, . . . , 3300-n, as illustrated in FIG. 5A. In an M-PLP operation, the baseband formatting block generates a plurality of PLPs as necessary.

Figure 5B:
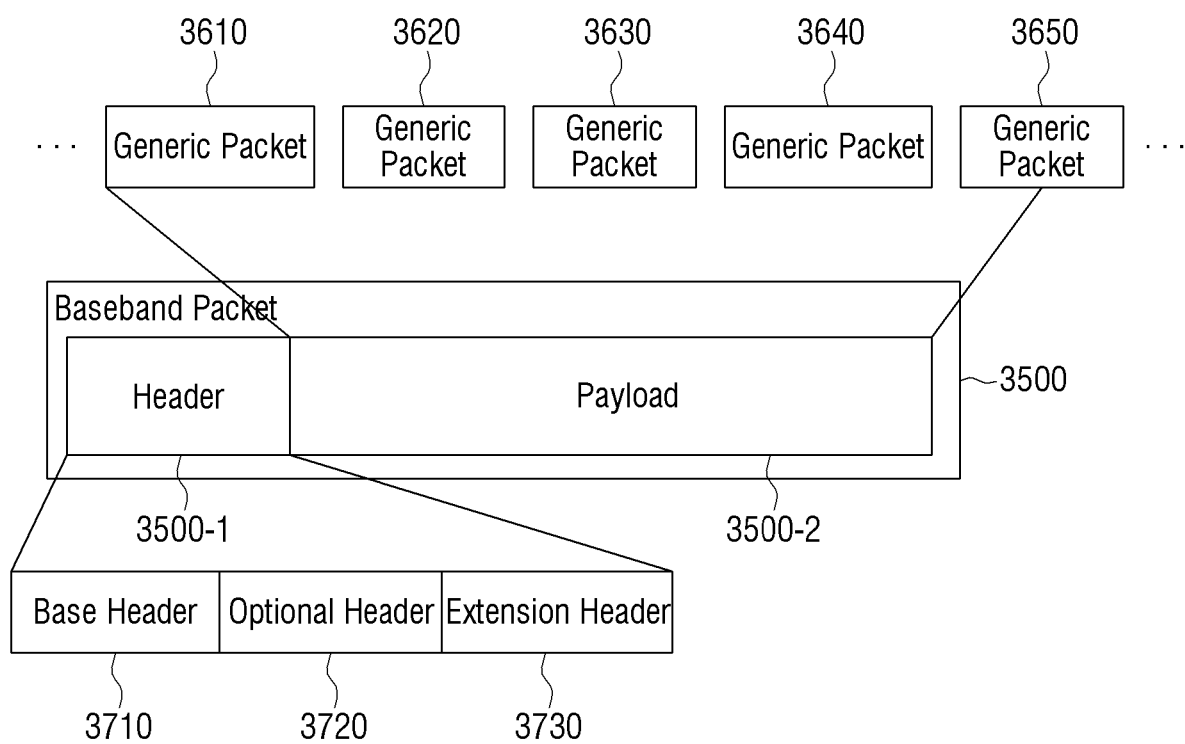
FIG. 5B is a diagrams for describing a detailed configuration of a baseband packet, according to an exemplary embodiment.

The baseband packet construction blocks 3100, 3100-1, . . . , 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-n construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , 3000-n scramble the baseband packet.

Figure 6:
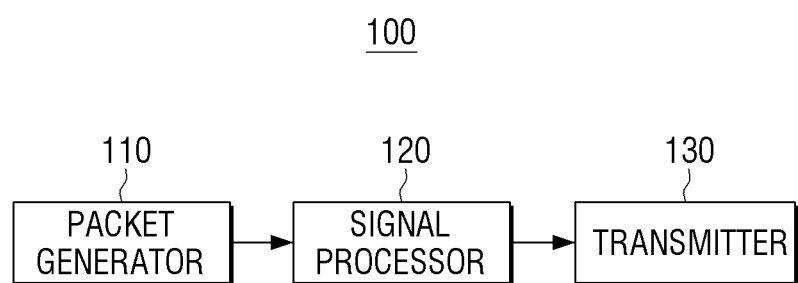
FIG. 6 is a block diagram illustrating a configuration of a transmitting apparatus, according to an exemplary embodiment.

FIG. 6 is a block diagram illustrating a configuration of a transmitting apparatus according to an exemplary embodiment.

Referring to FIG. 6, a transmitting apparatus 100 includes a packet generator 110, a signal processor 120, and a transmitter 130.

The packet generator 110 may generate a packet including a header and a payload, for example, a baseband packet (alternatively, an L1 packet) based on an input packet. Here, the packet includes the header and the payload including the input packet, and is defined as a k payload having a fixed length. The length of the packet may be set according to selected code rate and code length. Here, the input packet may be, for example, an ATSC link layer protocol (ALP) packet. The ALP packet includes one of an internal protocol (IP) packet, a transport stream (TS) packet, and a signaling packet or may include a combination thereof. In detail, the input IP packet, TS packet, and various types of data are encapsulated to be generated as the ALP packet for transmission to each PLP and the ALP packet corresponds to an L2 packet in an ISO 7 layer model. Further, the data included in the payload is not limited to the aforementioned example, and the payload may include various types of data. Hereinafter, for convenience of description, the packet generated by the packet generator 110 is called a baseband packet and the input packet is called an ALP packet.

A process of generating the baseband packet will be described with reference to FIGS. 7A and 7B.

Figure 7A:
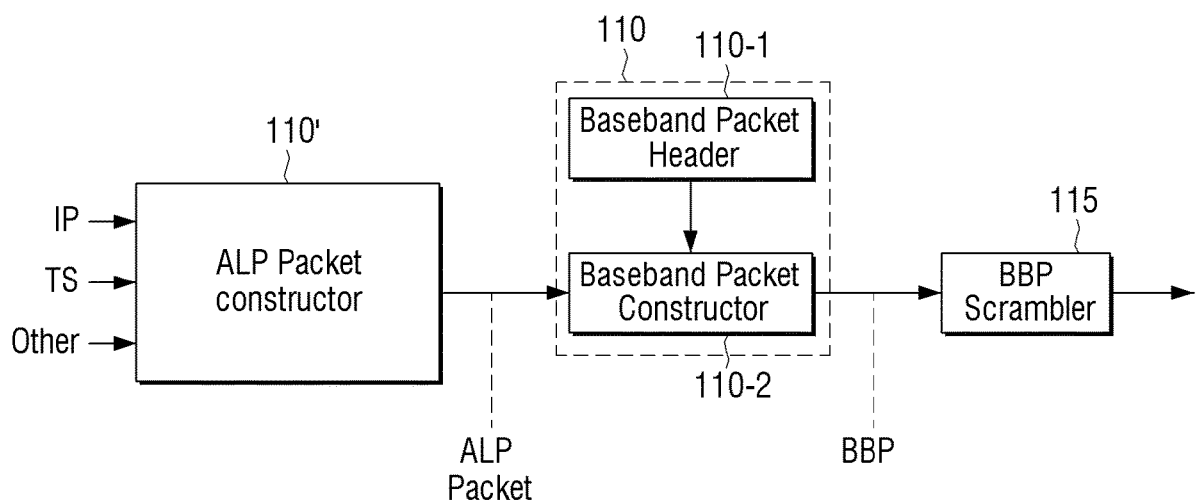
FIG. 7A is a block diagram illustrating a detailed configuration of a packet generator, according to an exemplary embodiment.

FIG. 7A is a block diagram illustrating a detailed configuration of a packet generator according to an exemplary embodiment.

Referring to FIG. 7A, the packet generator 110 may include a baseband packet header generator 110-1 and a baseband packet constructor 110-2. In addition, the packet generator 110 may transmit a generated baseband packet to a baseband packet scrambler 115.

In addition, an ALP packet constructor 110' may generate an ALP packet for transmitting to each PLP in association with an input mode from an input IP packet, a TS packet, and various types of data. Herein, the ALP packet corresponds to an L2 packet in an ISO 7 layer model. That is, the ALP packet constructor 110' may generate an ALP packet by encapsulating the packets (the IP packet, the TS packet, and the like) input from input upper layers of Layer 2 or higher.

In detail, the ALP packet constructor 110' may generate an ALP packet (i.e., an L2 packet) including a header and ALP payload data based on the input stream. Herein, the header means the header of the ALP packet, and may include information about the ALP payload data included in the ALP packet and information about at least one packet included in the ALP packet.

The baseband packet header generator 110-1 may generate a header inserted into the baseband packet. Herein, the header inserted into the baseband packet is referred to as a baseband packet header and the baseband packet header includes information about the baseband packet.

In particular, the baseband packet header generator 110-1 may generate the baseband packet header including information about the number of TS packets in the ALP packet, the number of removed null packets, and the like when an input stream is a TS. Besides, the baseband packet header generated by the baseband packet header generator 110-1 may include various information which will be described below.

Further, the baseband packet constructor 110-2 encapsulates the baseband packet header generated from the baseband packet header generator 110-1 in the ALP packet output from the ALP packet constructor 110' to generate the baseband packet.

Further, the packet generator 110 arranges a plurality of ALP packets including the IP packet and the header to generate the arranged ALP packets as a baseband packet having a size corresponding to an FEC code. The baseband packet according to the exemplary embodiment may be a TS packet, but the same process may be applied to various types of data described above as well as the TS packet.

In addition, the baseband packet scrambler 115 mixes data stored in the baseband packet in a random order before the FEC code is added to each baseband packet to generate the scrambled baseband packet. The scrambled baseband packet is transmitted through a PLP to be signal-processed. In this case, one PLP may be constituted by baseband packets having a fixed size. That is, the input stream may be encapsulated to the baseband packet for one PLP.

Meanwhile, the PLP means a signal path which is independently processed. That is, respective services (for example, video, extension video, audio, a data stream, and the like) may be transmitted and received through multiple RF channels and the PLP is a path through which the services are transmitted or a stream transmitted through the path. Further, the PLP may be positioned at slots distributed on multiple RF channels at a time interval or distributed on one RF channel at a time interval. That is, one PLP may be transmitted while being distributed on one RF channel or multiple RF channels at a time interval.

A PLP structure is constituted by Input mode A providing one PLP and Input mode B providing multiple PLPs. When the PLP structure supports the Input mode B, the PLP structure may provide a strong specific service and a time interleaving length is increased by distributing and transmitting one stream to acquire a time diversity gain. Further, when only a specific stream is received, a power supply of the receiver is turned off for a residual time to be used with low power, and as a result, the receiver is suitable for providing portable and mobile broadcasting services.

Herein, the time diversity is technology that when a transmitting side transmits the same signal at a predetermined time interval several times in order to reduce deterioration of a transmission quality in a mobile communication transmission path, a receiving side synthesizes the received signals again to acquire excellent transmission quality.

Further, information which may be commonly transmitted to a plurality of PLPs is transmitted while being included in one PLP to increase transmission efficiency. In this case, PLP0 performs such a role and the PLP is referred to as a common PLP, and residual PLPs other than the PLP0 may be used for data transmission and the PLP is referred to as a data PLP. When such a PLP is used, a home HDTV program may be received and an SDTV program may be provided even while carrying and moving. Further, various broadcasting services may be provided to a viewer through a broadcasting station or a broadcasting content provider and differentiated services in which a broadcast may be received may be provided even in a fringe area where viewing is difficult.

Figure 7B:
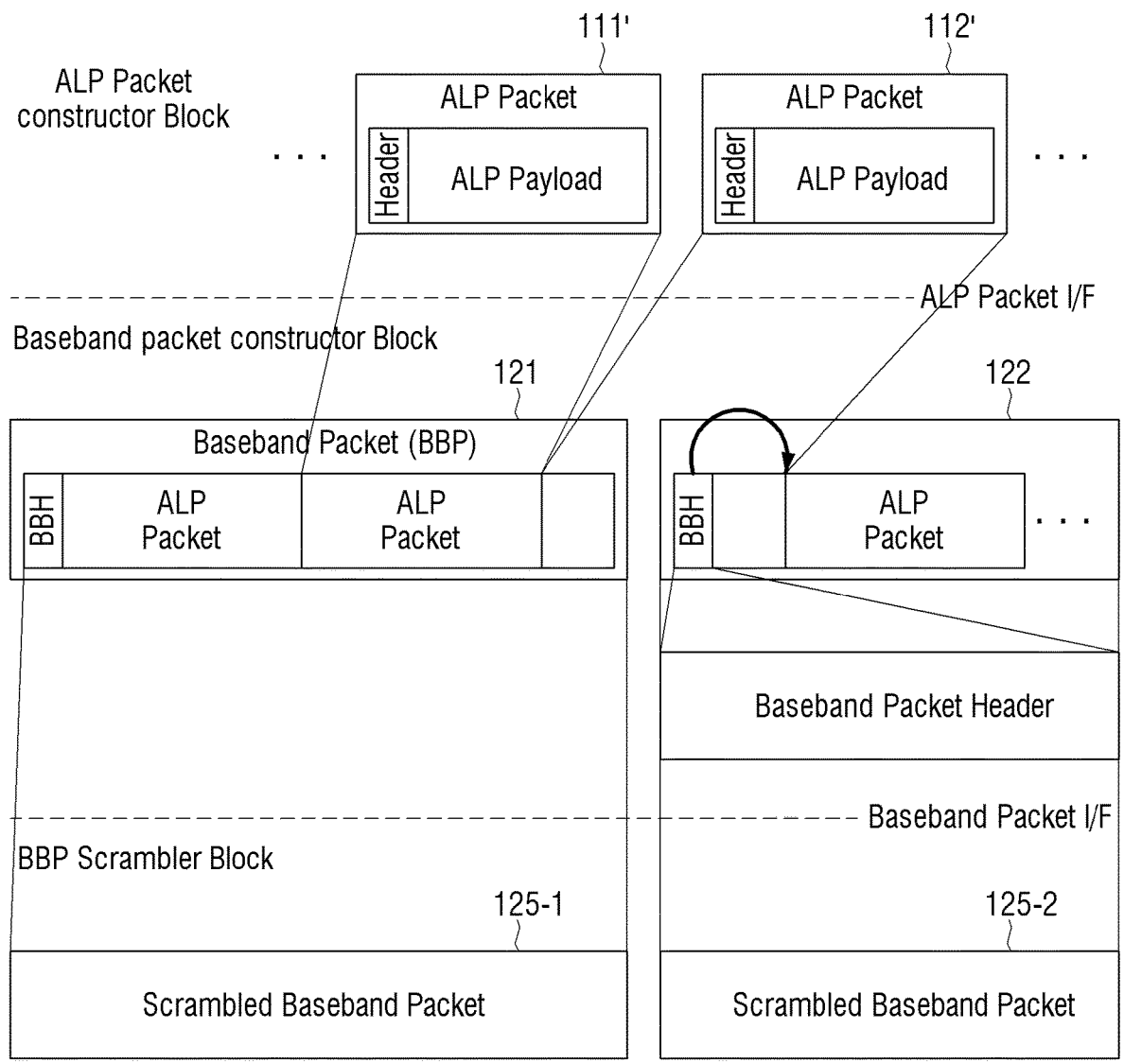
FIG. 7B is a diagram illustrating an ALP packet, a baseband packet, and a scrambled baseband packet according to an exemplary embodiment.

Meanwhile, FIG. 7B is a diagram illustrating an ALP packet, a baseband packet, and a scrambled baseband packet according to an exemplary embodiment.

Referring to FIG. 7B, when the ALP packet constructor 110' stores the TS packet in the ALP payload and inserts the header to generate a plurality of ALP packets 111' and 112', the packet generator 130 groups the plurality of generated ALP packets 111' and 112' and inserts the baseband packet header to generate a plurality of baseband packets 121 and 122. Herein, the respective baseband packets 121 and 122 may include a plurality of ALP packets and further, may include some of the ALP packets.

The baseband packet scrambler 115 randomly scrambles the baseband packets 121 and 122 to generate a plurality of scrambled baseband packets 125-1 and 125-2. In addition, the scrambled baseband packets 125-1 and 125-2 are transmitted to the PLP as described above and subjected to signal processing for adding the FEC code.

Referring back to FIG. 6, the signal processor 120 may signal-process the generated packet. Here, the generated packet means the baseband packet as described above.

In detail, the signal processor 120 signal-processes the baseband packet to generate a transmission frame.

Further, the signal processor 120 may insert signaling information into a signaling area of the frame. Herein, the signaling information may be a layer 1 (L1) signaling signal transmitting an L1 signal for frame synchronization, and a preamble into which the L1 signaling information is inserted may include an L1 pre signaling area and an L1 post signaling area. Further, the L1 post signaling area includes a configurable field and a dynamic field.

Meanwhile, the L1 pre signaling area may include information for analyzing the L1 post signaling and information about the entire system, and the L1 pre signaling area may be implemented to have the same length at all times. Further, the L1 post signaling area may include information about the respective PLP and information about the system, and in one superframe, the L1 signaling areas included in respective frames have the same length, but contents included in the L1 signaling areas may vary.

Meanwhile, although not illustrated, the signal processor 120 may perform functions corresponding to bit interleaved and coded modulation (BICM) blocks 12000 and 12000-1 and framing/interleaving blocks 13000 and 13000-1 illustrated in FIGS. 3A to 3C.

The transmitter 130 may transmit the signal-processed frame to a receiving apparatus (not illustrated).

In detail, the transmitter 130 may perform functions corresponding to waveform generation blocks 14000 and 14000-1 illustrated in FIGS. 3A to 3C. That is, the transmitter 130 performs modulation for modulating the generated frame to the RF signal, and transmits the RF signal to a receiving apparatus (not illustrated).

Figure 8:
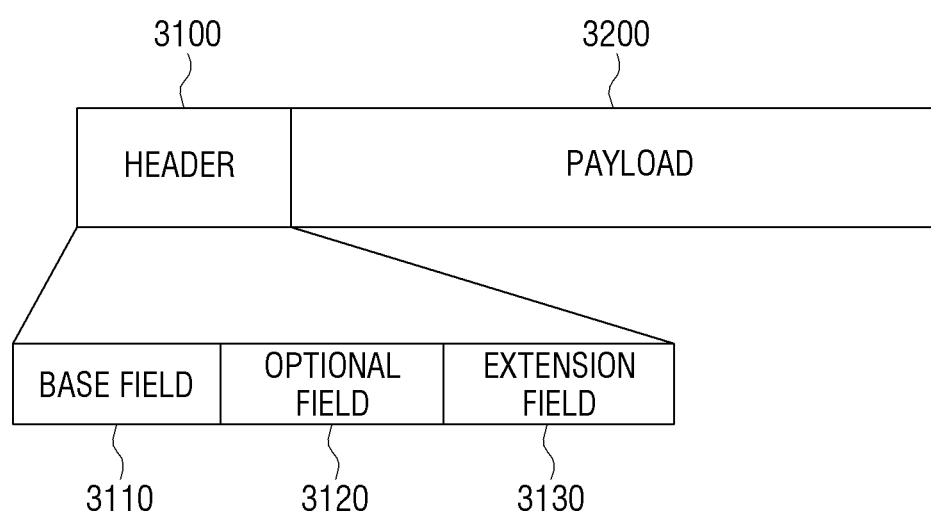
FIG. 8 is a diagram illustrating a packet structure, according to an exemplary embodiment.

Meanwhile, FIG. 8 is a diagram illustrating a packet structure according to an exemplary embodiment. Here, it is defined in advance that the packet generated from the packet generator 110 used in this specification means a baseband packet.

Referring to FIG. 8, the baseband packet is constituted by a header 3100 and a payload 3200. The header 3100 may be again divided into a base field 3110, an optional field 3120, and an extension field 3130 according to a role thereof. Here, the base field will be defined as the same meaning as the base header. The baseband packet header 3100 may necessarily include the base field 3110, and whether the optional field 3120 is present may vary according to a control field value of the base field 3110. Further, whether the extension field 3130 is present may be selected by using a control field of the optional field 3120.

Meanwhile, the base field, the optional field, and the extension field used in this specification may correspond to a base header, an optional header, and an extension header, respectively.

Hereinafter, a structure of the header will be described with reference to the accompanying drawings. Here, the header may mean a header of the baseband packet.

Figure 9:
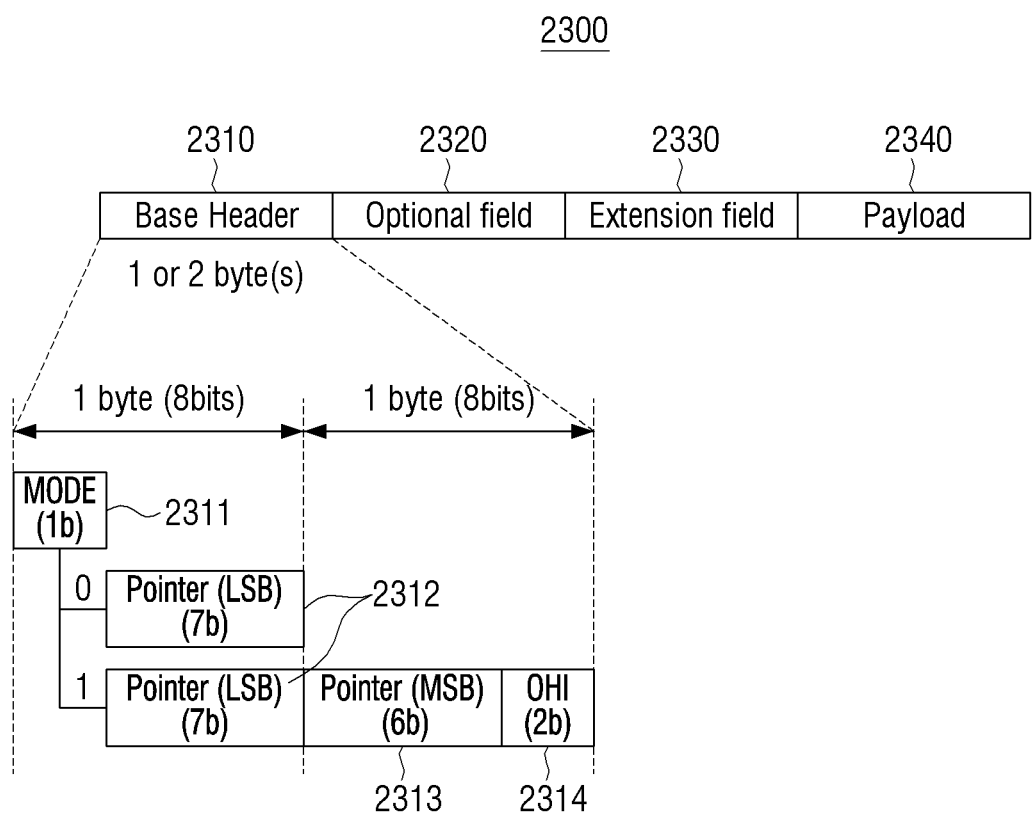
FIG. 9 is a diagram illustrating a header structure, according to an exemplary embodiment.

FIG. 9 is a diagram illustrating a structure of a header according to an exemplary embodiment.

Referring to FIG. 9, a baseband packet 2300 may include a base header 2310, an optional field 2320, an extension field 2330, and a payload 2340.

Meanwhile, in this specification, terms such as the base header, the optional field, and the extension field are used and described, but of course, the terms may be expressed by general words such as a first header, a second field, and a third field.

In detail, the baseband packet may be largely divided into a header and a payload, and here, the header may be constituted by three parts as illustrated in FIG. 9. The first part is the base header 2310 and exists in all packets. In addition, the second part is the optional field 2320 and the third part is the extension field 2330. The optional field 2320 and the extension field 2330 are not always present in all packets, and the base header 2310 includes information representing (or indicating) whether the optional field 2320 and the extension field 2330 are present.

Further, the header may include the base header 2310 including information representing a start point of a data packet in the payload 2340 and information about whether an additional field is present. That is, the base header 2310 may include information representing the start point of the data packet in the payload 2340. In detail, the base header 2310 may perform a function of providing a pointer including an offset value of a byte unit up to a start point of a next generic packet (also referred to as "data packet" or "ALP packet") which is present in the packet 2300. Here, the start point of the data packet means a distance between the start point of the payload 2340 and the start point of the data packet, and the distance may be expressed by the aforementioned offset value of the byte unit.

As illustrated in FIG. 7B, a first ALP packet 111' is not segmented and may be included in the first packet 121, but may be segmented together with a second ALP packet 112' to be included in the first packet 121 and the second packet 122.

In this case, the base header included in the header of the first packet 121 may include information representing a start point of the first ALP packet 111', and in detail, may include information including a value of a distance between the payload start point of the first packet 121 and the start point of the first ALP packet 111'.

Further, the base header included in the header of the second packet 122 may include information representing a start point of the ALP packet included next to the second packet 112'.

For example, when the generic packet is disposed from the start point in the packet, a value of the pointer may be set to 0. In addition, the pointer may be extended to 2 bytes, and thus, the value represented by the pointer may be increased up to 8191. That is, the base header 2310 may express the distance to the start point, where the generic packet starts in the packet, by the value of 8191.

In detail, the information representing the start point of the data packet (i.e., the ALP packet) may include information about whether a most significant bit (MSB) part of the pointer is present according to the distance between the start point of the payload and the start point of the data packet, and may include one of a first value representing that the MSB part is not present and a second value representing that the MSB part is present. That is, when the information representing the start point of the data packet is set to 0, it represents that the MSB part is not present, and when the information representing the start point of the data packet is set to 1, it represents that the MSB part is present.

Referring to FIG. 9, the base header 2310 has a MODE field 2311 therein which includes the information about the start point of the data packet, and the MODE field 2311 represents whether an MSB part of the pointer is present. Here, the MODE field 2311 may has a size of 1 bit.

When the MODE field 2311 is set to 0, the MODE field 2311 represents that a distance from a start point of the payload 2340 to a start point of a new generic packet (i.e. data packet) in the payload 2340 is a short pointer length. Here, the short pointer length means a length which is not beyond 127 bytes. Accordingly, a pointer field including the information about the distance from the start point of the payload 2340 to the start point of the new generic packet in the payload 2340 includes only a pointer (LSB) field 2312 corresponding to the short pointer length and the pointer (MSB) field 2313 is not included. Here, the length of the pointer (LSB) field 2312 is 7 bits.

Further, when the MODE field 2311 is set to 0, the pointer field includes only the pointer (LSB) field 2312, and thus, the length of the base header 2310 becomes 1 byte.

Meanwhile, when the MODE field 2311 is set to 1, the MODE field 2311 represents that a distance from a start point of the payload 2340 to a start point of a new generic packet in the payload 2340 is a long pointer length. Here, the long pointer length may be equal to or larger than 128 bytes. Accordingly, a pointer field including the information about the distance from the start point of the payload 2340 to the start point of the new generic packet in the payload 2340 may include a pointer (MSB) field 2313 as well as the pointer (LSB) field 2312 in order to represent the long pointer length. The length of the pointer (MSB) field 2313 is 6 bits.

Further, when the MODE field 2311 is set to 1, the base header 2310 may include an OHI field 2314 representing information about whether an additional field is present in the header. The length of the OHI field 2314 is 2 bits.

Accordingly, when the MODE field 2311 is set to 1, the base header 2310 includes the MODE field 2311, the pointer (LSB) field 2312, the pointer (MSB) field 2313, and the OHI field 2314, and thus, the length of the base header 2310 becomes 2 bytes.

As a result, the pointer (MSB) field 2313 and the OHI field 2314 may be included in the base header 2310 only when the MODE field 2311 is set to 1.

Meanwhile, information about whether the additional field is present in the header may include information about whether at least one of the optional field 2320 and the extension field 2330 is present and a length of the optional field 2320 and the extension field 2330.

Further, the information about whether the additional field is present may include one of a first value representing that the optional field 2320 and the extension field 2330 are not present, a second value representing the optional field 2320 is present, the extension field 2330 is not present, and the length of the optional field 2320 is 1 byte, a third value representing that the optional field 2320 is present, the extension field 2330 is not present, and the length of the optional field 2320 is 2 bytes, and a fourth value representing that the optional field 2320 and the extension field 2330 are present and the length of the optional field 2320 and the extension field 2330 exceeds 2 bytes.

In addition, the optional field 2320 may include information representing a length of the extension field 2330 when the information about whether the additional field is present is set to the fourth value and may include at least one of the LSB part and the MSB part according to the length of the extension field.

The information about whether the additional field is present may be stored in the optional header indicator (OHI) field 2314. In detail, the length of the OHI field 2314 is 2 bytes, and the length of the optional field 2320 may be equal to or smaller than 2 bytes. Information representing values stored in the OHI field 2314 may be summarized in following Table 1.

TABLE 1

| OHI field | Content |
| --- | --- |
| 00 | Optional field and extension field are not present |
| 01 | Optional field is present, extension field is not present, and length of the optional field is 1 byte. |
| 10 | Optional field is present, extension field is not present, and length of the optional field is 2 bytes. |
| 11 | Optional field and extension field are present, and length of the optional field and extension field exceeds 2 bytes. Length of optional field is 1 byte or 2 bytes, actual length of the extension field is indicated in EXT_LEN field of optional field. |

In detail, how the optional field 2320 and the extension field 2330 are included in the header according to a value set in the OHI field 2314 will be described with reference to FIG. 10.

Figure 10:
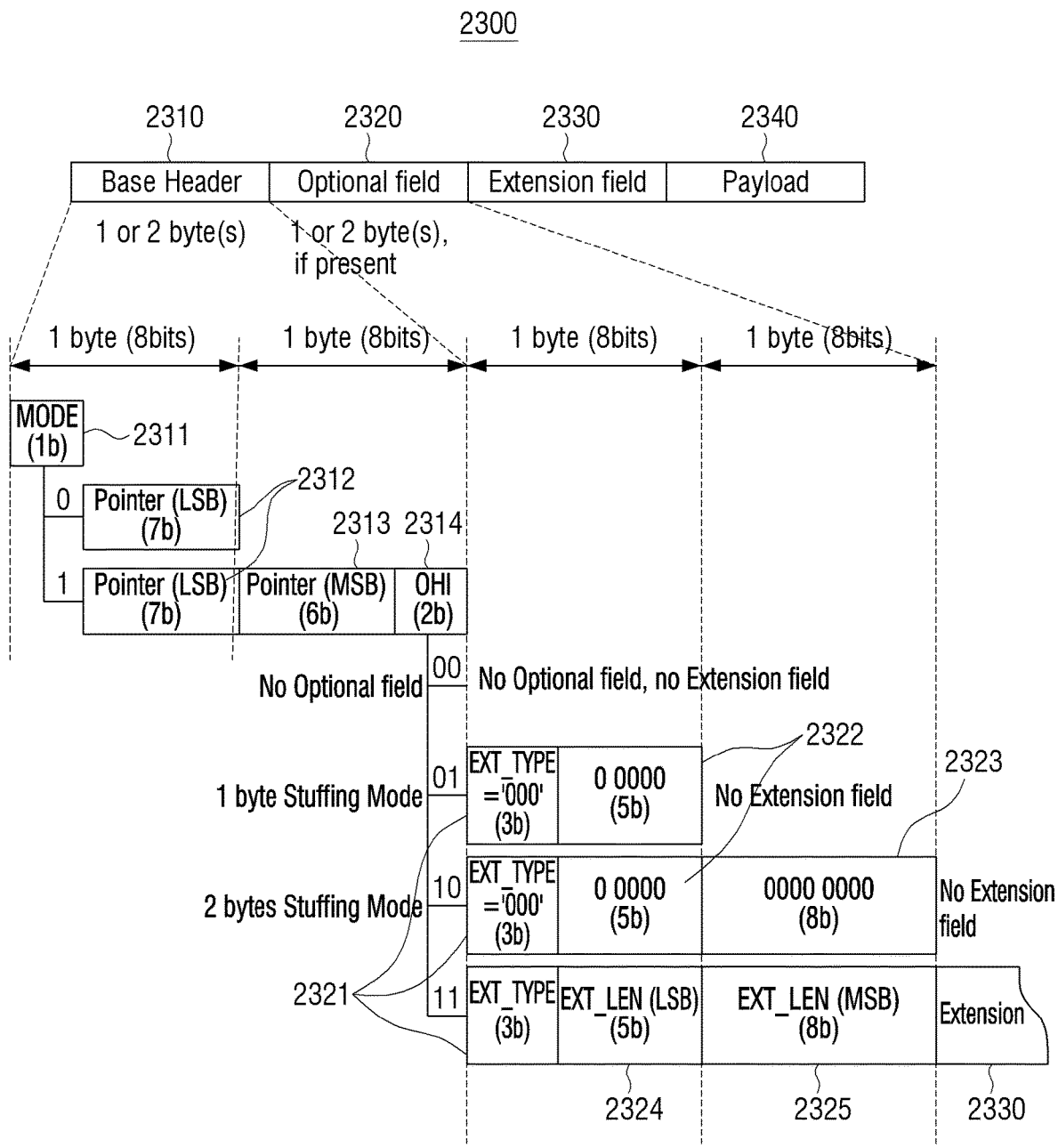
FIG. 10 is a diagram illustrating a detailed configuration of an optional field, according to an exemplary embodiment.

FIG. 10 is a diagram illustrating a detailed configuration of the optional field according to an exemplary embodiment.

Referring to FIG. 10, when the OHI field 2314 is set to 00, the header does not include the optional field 2320 and the extension field 2330.

In addition, when the OHI field 2314 is set to 01, the header includes the optional field 2320 having the length of 1 byte. Here, the optional field 2320 may include information representing whether the optional field 2320 includes padding. In detail, the optional field 2320 may include an EXT_TYPE field 2321 representing whether the optional field 2320 2330 includes padding. Here, the length of the EXT_TYPE field 2321 is 3 bits. In addition, a remaining region 2322 of 5 bits except for the EXT_TYPE field 2321 among 1 byte of the optional field 2320 may include predetermined information or padding. The remaining region 2322 may include the predetermined information or the padding according to the information included in the EXT_TYPE field 2321. Here, the padding means meaningless data, and the meaningless data may be randomly determined by various methods according to a system design. Further, the padding is not required to be filled only with 0, may be filled only with 1, and may be filled with a meaningless combination of 0 and 1. However, a case where the padding is filled only with 0 will be described as an example.

Further, when the OHI field 2314 is set to 10, the header includes the optional field 2320 having a length of 2 bytes. Similarly, the optional field 2320 may include information representing whether the optional field 2320 includes padding. In detail, the optional field 2320 may include an EXT_TYPE field 2321 representing whether the optional field 2320 includes padding, and here, the length of the EXT_TYPE field 2321 is 3 bits. In addition, remaining 5-bit region 2322 and 8-bit region 2323 except for the EXT_TYPE field 2321 among 2 bytes of the optional field 2320 may include predetermined information or padding. The remaining 5-bit region 2322 and 8-bit region 2323 may include the predetermined information or the padding according to the information stored in the EXT_TYPE field 2321. Here, the padding means meaningless data, and the meaningless data may be randomly determined by various methods according to a system design.

Meanwhile, when the OHI field is set to 11, the header may include the extension field 2330 as well as the optional field 2320. Here, a total length of the optional field 2320 and the extension field 2330 exceeds 2 bytes, and the length of the optional field 2320 may be 1 byte or may be 2 bytes. Further, the optional field 2320 may include information representing whether at least one of the optional field 2320 and the extension field 2330 includes padding. In detail, the optional field 2320 may include an EXT_TYPE field 2321 representing whether at least one of the optional field 2320 and the extension field 2330 includes padding, and here, the length of the EXT_TYPE field 2321 is 3 bits.

However, when the OHI field 2314 is set to 11, the EXT_TYPE field 2321 sets a value corresponding to a type of the extension field 2330. For example, when the padding is stored in the extension field 2330, the EXT_TYPE field 2321 has a value meaning that the padding is stored in the extension field 2330 is stored. In addition, when the OHI field 2314 is set to 11, the optional field 2320 includes information representing the length of the extension field 2330, and thus, may include at least one of the LSB part and the MSB part according to the length of the extension field. Here, the optional field 2320 may include at least one of an EXT_LEN (LSB) field 2324 and an EXT_LEN (MSB) field 2325 representing the length of the extension field 2330. The length of the EXT_LEN (LSB) field 2324 may be 5 bits and the length of the EXT_LEN(MSB) field 2325 may be 8 bits.

When summarizing the aforementioned EXT_TYPE field 2321, the EXT_TYPE field 2321 is a 3-bit field representing a type of the extension field, the OHI field 2314 is set to 01, and when the EXT_TYPE field 2321 is set to 000, a bit sequence of "00000" may be stored in the optional field 2320. Further, the OHI field 2314 is set to 10 and when the EXT_TYPE field 2321 is set to 000, a bit sequence of "00000000" other than the bit sequence of "00000" may be additionally stored in the optional field 2320. Further, when the OHI field 2314 is set to 11, the EXT_TYPE field 2321 is filled with a value corresponding to the type of the extension field 2330 and at least one of the EXT_LEN (LSB) field 2324 and the EXT_LEN (MSB) field 2325 may be connected and disposed. Here, when the EXT_TYPE field 2321 is set to 000, the padding (that is, the bit sequence of 00000 or the bit sequence of 00000000) is filled in the optional field 2320, but it is just exemplified, and of course, what the value set in the EXT_TYPE field 2321 means may vary according to a design method.

The EXT_LEN (LSB) field 2324 represents the length of the extension field 2330 and includes 5 LSB bits of the EXT_LEN field. The EXT_LEN (LSB) field 2324 always exists when the OHI field 2314 is set to 11.

Further, when the EXT_LEN (MSB) field 2325 includes 8 MSB bits of the EXT_LEN field and the EXT_LEN (MSB) field 2325 is present, the optional field 2320 includes an EXT_LEN field of a total of 13 bits in which the EXT_LEN (LSB) field 2324 and the EXT_LEN (MSB) field 2325 are connected to each other. Accordingly, when the length of the extension field 2330 is equal to or smaller than the predetermined length, the optional field 2320 may include only the EXT_LEN (LSB) field 2324. When the length of the extension field 2330 is greater than the predetermined length, the optional field 2320 may include both the EXT_LEN (LSB) field 2324 and the EXT_LEN(MSB) field 2325.

Meanwhile, how the structure of the packet 2300 is entirely changed according to the values set in the MODE field 2311 and the OHI field 2314 will be described with reference to FIGS. 11 to 16D.

FIGS. 11 to 16D are diagrams illustrating structures of the packet according to various exemplary embodiments.

Figure 11:
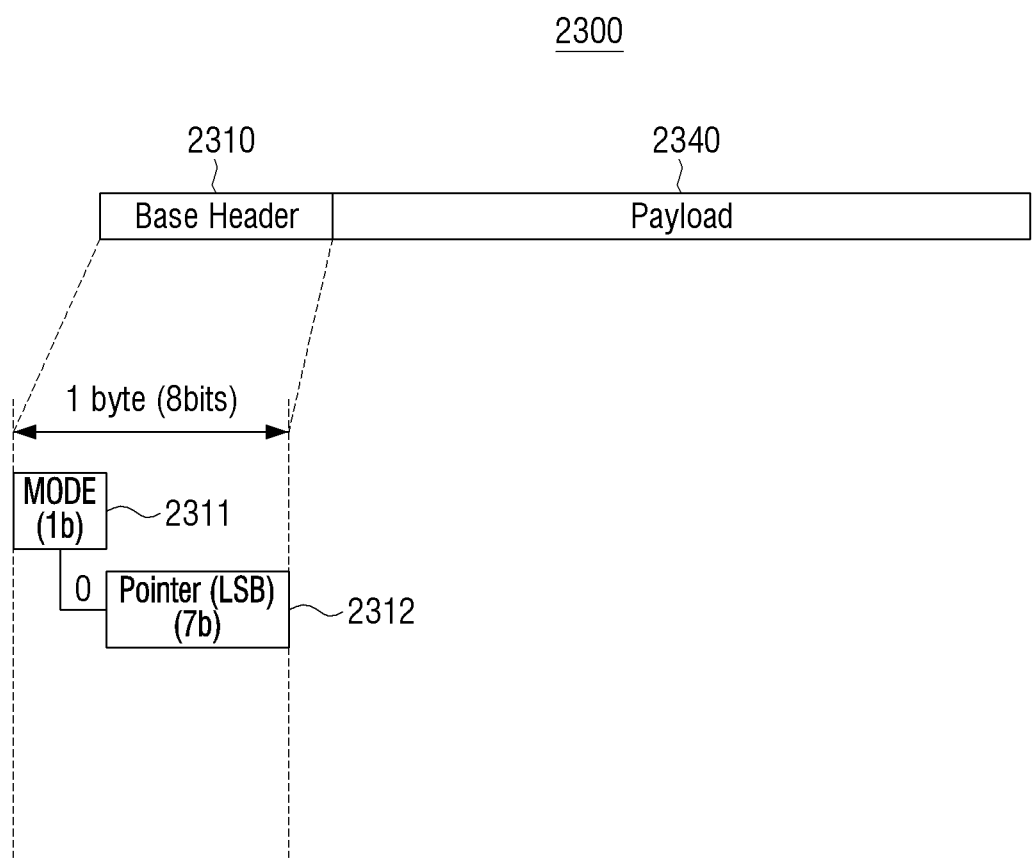
FIGS. 11 to 16D are diagrams illustrating structures of a packet, according to exemplary embodiments.

Referring to FIG. 11, when the MODE field 2311 is set to 0, the MODE field 2311 means the short pointer length, and thus, the base header 2310 includes only the pointer (LSB) field 2312. When the MODE field 2311 is set to 0, the optional field 2320 and the extension field 2330 are not included in the packet 2300, and as a result, the packet 2300 includes the base header having the length of 1 byte and the payload 2340.

Figure 12:
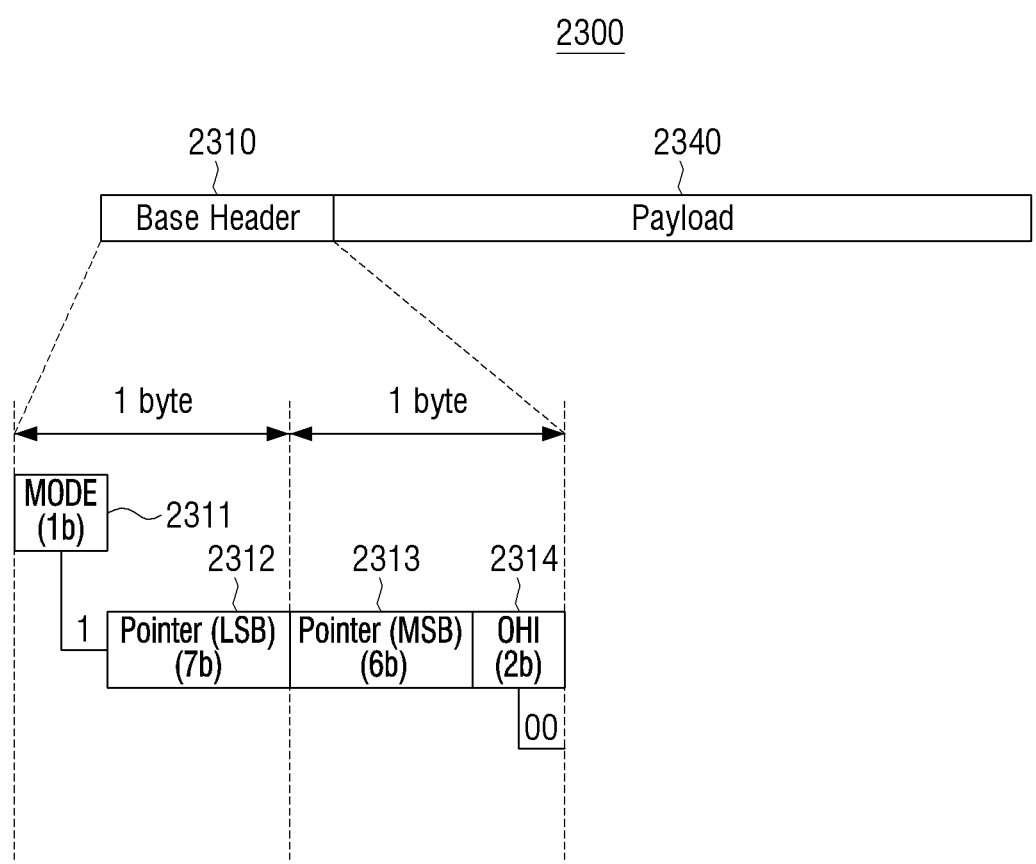

Referring to FIG. 12, when the MODE field 2311 is set to 1, the MODE field 2311 means the long pointer length, and thus, the base header 2310 includes the pointer (LSB) field 2312 and the pointer (MSB) field 2313, and may additionally include the OHI field 2314 including the information about whether the optional field 2320 and the extension field 2330 are present.

Accordingly, the packet 2300 includes the base header 2340 having the length of 2 bytes. However, in FIG. 12, when the OHI field 2314 is set to 00, the optional field 2320 and the extension field 2330 are not included in the packet 2300, and as a result, the packet 2300 includes the base header 2310 having a length of 2 bytes and the payload 2340.

Figure 13:
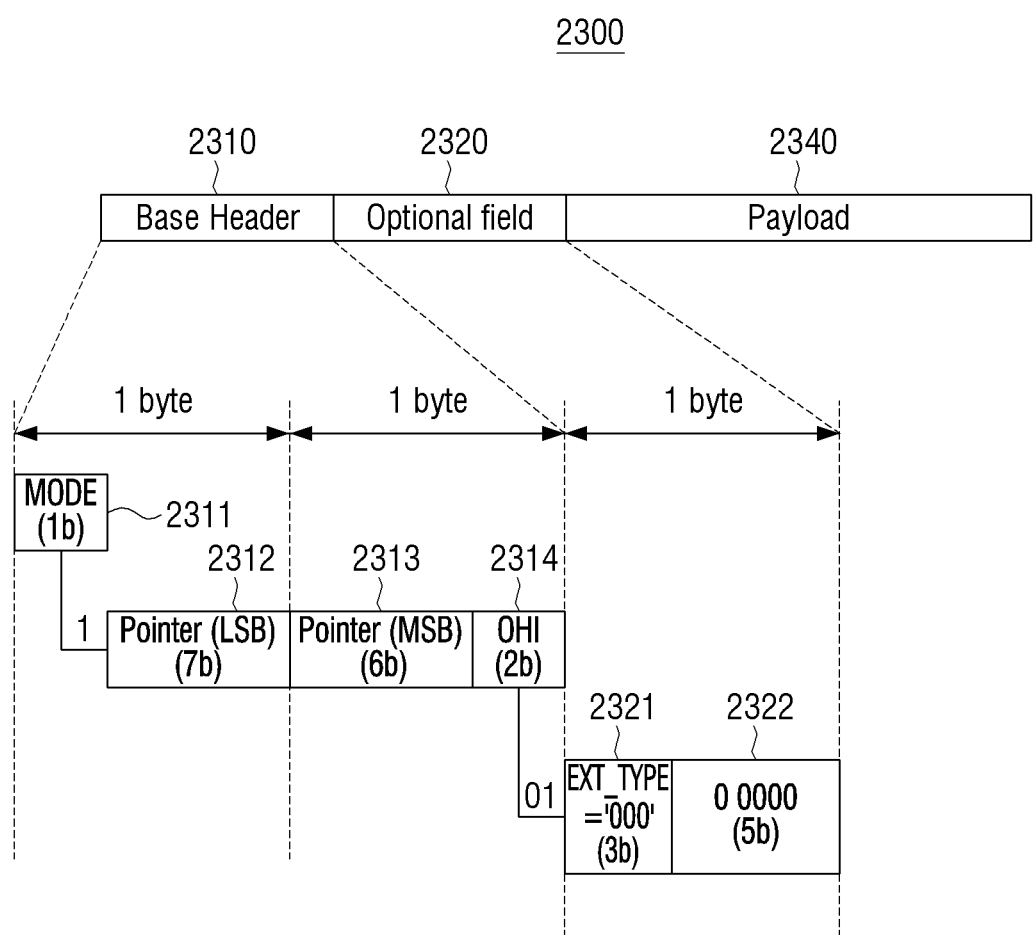

Referring to FIG. 13, when the MODE field 2311 is set to 1, the MODE field 2311 means the long pointer length, and thus, the base header 2310 includes the pointer (LSB) field 2312 and the pointer (MSB) field 2313 and may additionally include the OHI field 2314 including the information about whether the optional field 2320 and the extension field 2330 are present.

Accordingly, the packet 2300 includes the base header 2340 having the length of 2 bytes. However, in FIG. 13, the OHI field 2314 is set to 01 and thus, the optional field 2320 having a length of 1 byte is included in the packet 2300 and the extension field 2330 is not included in the packet 2300. As a result, the packet 2300 includes the base header having a length of 2 bytes, the optional field 2320 having a length of 1 byte, and the payload 2340. Further, the optional field 2320 may include the EXT_TYPE field 2321 of 3 bits and a padding field 2322 of 5 bits.

Figure 14:
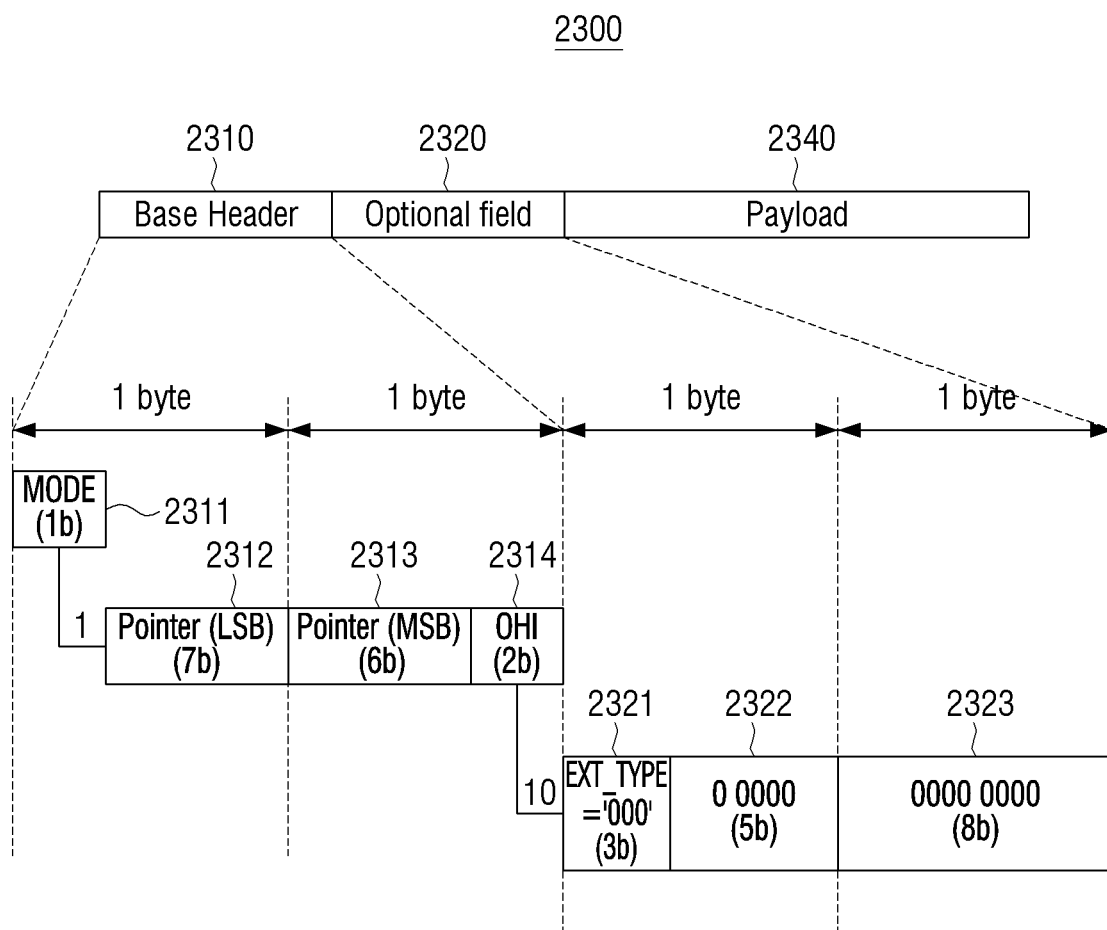

Referring to FIG. 14, when the MODE field 2311 is set to 1, the MODE field 2311 means the long pointer length, and thus, the base header 2310 includes the pointer (LSB) field 2312 and the pointer (MSB) field 2313 and may additionally include the OHI field 2314 including the information about whether the optional field 2320 and the extension field 2330 are present.

Accordingly, the packet 2300 includes the base header 2340 having the length of 2 bytes. However, in FIG. 14, the OHI field 2314 is set to 10 and thus, the optional field 2320 having a length of 2 bytes is included in the packet 2300 and the extension field 2330 is not included in the packet 2300. As a result, the packet 2300 includes the base header 2310 having a length of 2 bytes, the optional field 2320 having a length of 2 bytes, and the payload 2340. Further, the optional field 2320 may include the EXT_TYPE field 2321 of 3 bits, a padding field 2322 of 5 bits, and a padding field 2323 of 8 bits.

Figure 15:
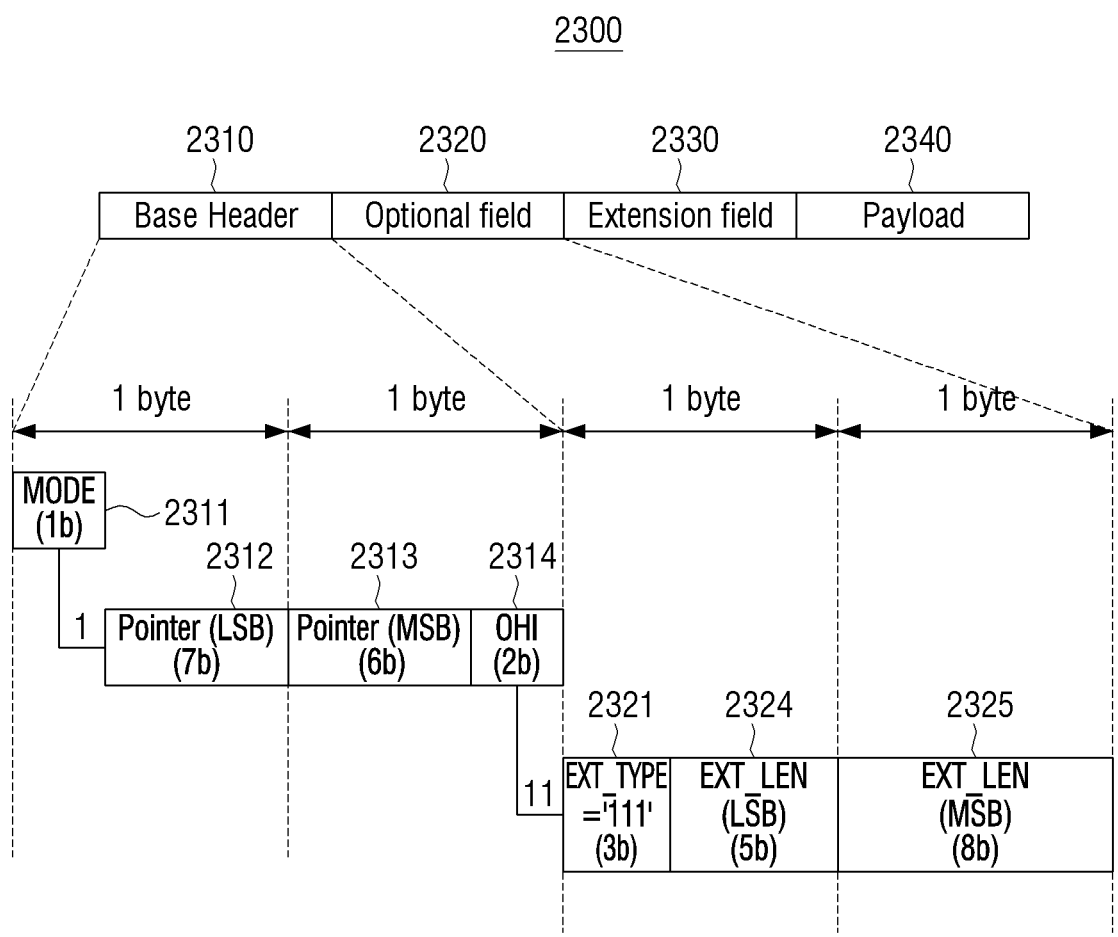

Referring to FIG. 15, when the MODE field 2311 is set to 1, the MODE field 2311 means the long pointer length, and thus, the base header 2310 includes the pointer (LSB) field 2312 and the pointer (MSB) field 2313 and may additionally include the OHI field 2314 including the information about whether the optional field 2320 and the extension field 2330 are present.

Accordingly, the packet 2300 includes the base header 2340 having the length of 2 bytes. However, in FIG. 15, the OHI field 2314 is set to 11 to include the base header 2310 having the length of 2 bytes, the optional field 2320 having the length of 2 bytes, the extension field 2330, and the payload 2340. Further, the optional field 2320 may include the EXT_TYPE field 2321, the EXT_LEN(LSB) field 2324, and the EXT_LEN(MSB) field 2325.

In FIG. 15, the case where the optional field 2320 includes both the EXT_LEN (LSB) field 2324 and the EXT_LEN (MSB) field 2325 is illustrated. However, the optional field 2320 may include only the EXT_LEN (LSB) field 2324. In this case, the packet 2300 may include the base header 2310 having the length of 2 bytes, the optional field 2320 having the length of 1 byte, the extension field 2330, and the payload 2340.

Further, in the aforementioned example, the case where the optional field 2320 has at least one of the padding field 2322 of 5 bits and the padding field 2323 of 8 bits is exemplified, but the optional field 2320 may include predetermined data other than the padding and the EXT_TYPE field 2321 may also include a value representing the predetermined data.

Meanwhile, FIGS. 16A to 16D illustrate that the data filled in the optional field 2320 and the extension field 2330 may vary according to the value set in the EXT_TYPE field 2321 when the OHI field 2314 is set to 11.

Figure 16A:
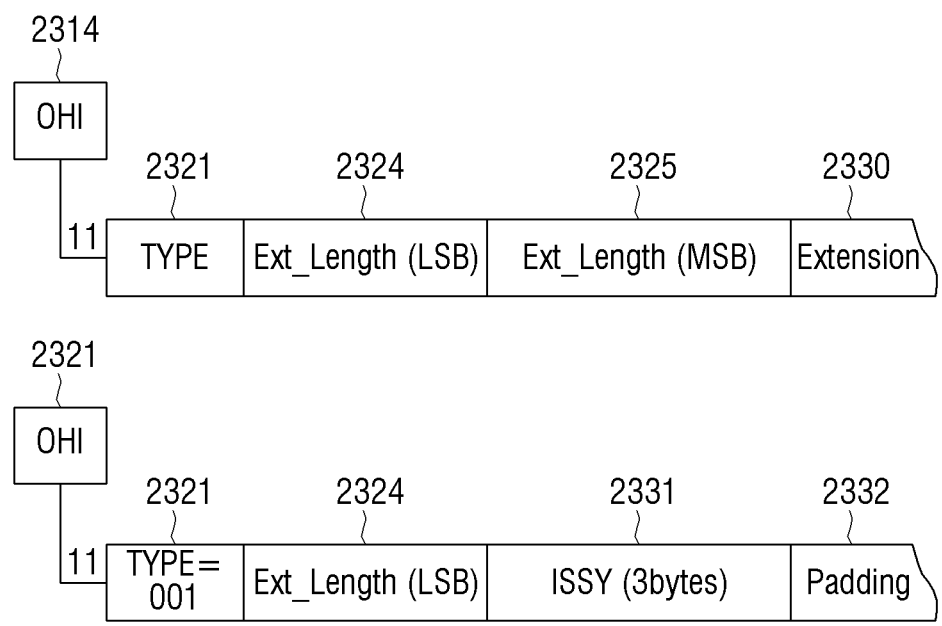

Referring to FIG. 16A, when the OHI field is set to 11, the optional field 2320 includes a TYPE field 2321, an EXT_LEN (LSB) field 2324, and an EXT_LEN (MSB) field 2325, and a representative example where the extension field 2330 is present is illustrated.

Here, when the TYPE field 2321 is set to 001, the optional field 2320 may include only the EXT_LEN (LSB) field 2324, and the extension field 2330 may include an input stream synchronization (ISSY) field 2331 and a padding 2332. Here, the ISSY field 2331 is exemplified in order to describe a case where the extension field 2330 includes predetermined data. The ISSY field 2331 is used to transmit a clock counter value according to a clock modulation ratio and regenerate accurate timing for restoring an output stream by a receiver of the transmission frame.

Figure 16B:

Further, referring to FIG. 16B, when the TYPE field 2321 is set to 010, the optional field 2320 may include the EXT_LEN (LSB) field 2324 and the EXT_LEN (MSB) field 2325, and the extension field 2330 may include an ISSY field 2333 and a padding 2332.

Figure 16C:
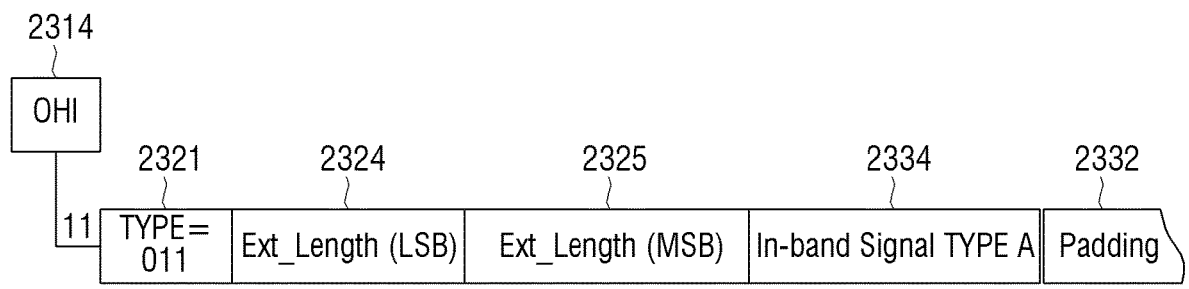
Figure 16D:

Of course, the extension field 2330 may include various data other than the ISSY field 2333 as the predetermined data. Referring to FIG. 16C, when the TYPE field 2321 is set to 011, the optional field 2320 includes the EXT_LEN (LSB) field 2324 and the EXT_LEN (MSB) field 2325, and the extension field 2330 may include an in-band signal TYPE A field 2334 and a padding 2332. Referring to FIG. 16D, when the TYPE field 2321 is set to 100, the optional field 2320 includes the EXT_LEN (LSB) field 2324 and the EXT_LEN (MSB) field 2325, and the extension field 2330 may include an in-band signal TYPE B field 2335 and a padding 2332.

Meanwhile, the terms used in describing the aforementioned ALP packet and baseband packet may vary according to the system, and for example, the aforementioned ALP packet and baseband packet may be referred to as a baseband packet and a baseband frame, respectively, according to the system.

According to another exemplary embodiment, the optional field and the extension field may include fields having different structures and this will be described in detail with reference to FIGS. 17 to 25. Further, before describing that the optional field and the extension field may include fields having different structures, description for a field included in a base field to be described below may correspond to a portion described in FIG. 9, but will be described again by using general terms.

Referring back to FIG. 6, the transmitting apparatus 100 includes a packet generator 110, a signal processor 120, and a transmitter 130, and the packet generator 110 may generate a packet including a header and a payload based on an input packet.

Here, the input packet may be, for example, an ALP packet (also referred to as an L2 packet) and the packet generated in the packet generator 110 may be a baseband packet (BBP) (also referred to as an L1 packet). Of course, as described above, the terms of the packets may vary according to the system and for example, the aforementioned ALP packet and BBP packet may be referred to as the BBP packet and a baseband frame (BBF), respectively, according to the system.

The packet, that is, the baseband packet may include a header and a payload including an input packet, and the packet is defined as a K payload with a fixed length. The length of the packet may be set according to selected code rate and code length.

In addition, the input packet, that is, the ALP packet includes one of an internal protocol (IP) packet, a TS packet, and a signaling packet, or may include a combination thereof. In detail, the input IP packet and TS packet, and various types of data are encapsulated to be generated as the ALP packet for transmission to each PLP, and the ALP packet corresponds to an L2 packet in the ISO 7 layer model. However, the data included in the payload is not limited to the aforementioned example, and the payload may include various types of data.

In addition, the signal processor 120 may signal-process the generated packet. In detail, the signal processor 120 signal-processes the packet to generate the transmission frame. Further, the signal processor 120 may insert signaling information into a signaling area of the frame. Herein, the signaling information may be a layer 1 (L1) signaling signal transmitting an L1 signal for frame synchronization, and a preamble into which the L1 signaling information is inserted may include an L1 pre signaling area and an L1 post signaling area. Further, the L1 post signaling area includes a configurable field and a dynamic field.

Although not illustrated, the signal processor 120 may perform functions corresponding to bit interleaved and coded modulation (BICM) blocks 12000 and 12000-1 and framing/interleaving blocks 13000 and 13000-1 illustrated in FIGS. 3A to 3C.

The transmitter 130 may transmit the signal-processed frame to a receiving apparatus or receiver (not illustrated).

In detail, the transmitter 130 may perform functions corresponding to the waveform generation blocks 14000 and 14000-1 illustrated in FIGS. 3A to 3C. That is, the transmitter 130 performs modulation for modulating the generated frame to the RF signal, and transmits the RF signal to the receiving apparatus or receiver.

Meanwhile, the base field configuring the header includes a first field set as a first value representing that the base field is a first length or a second value representing that the base field is a second length, and when the first field is set as the second value, the base field may include a second field representing least significant bits (LSB) of a pointer value representing a first value among respective start points of the input packets included in the payload and a third field representing most significant bits (MSB) of the point value.

Further, a header of a packet may be divided into a base field, an optional field, and an extension field according to a role thereof as illustrated in FIG. 8 described above, and the header necessarily includes a base field and whether the optional field is present may vary according to a value of a control value included in the base field. Further, whether the extension field is present may be selected according to the value of the control field included in the optional field.

Here, the first field, the second field, and the third field may be included in the base field configuring the header.

In detail, this will be described in detail with reference to FIG. 17.

Figure 17:
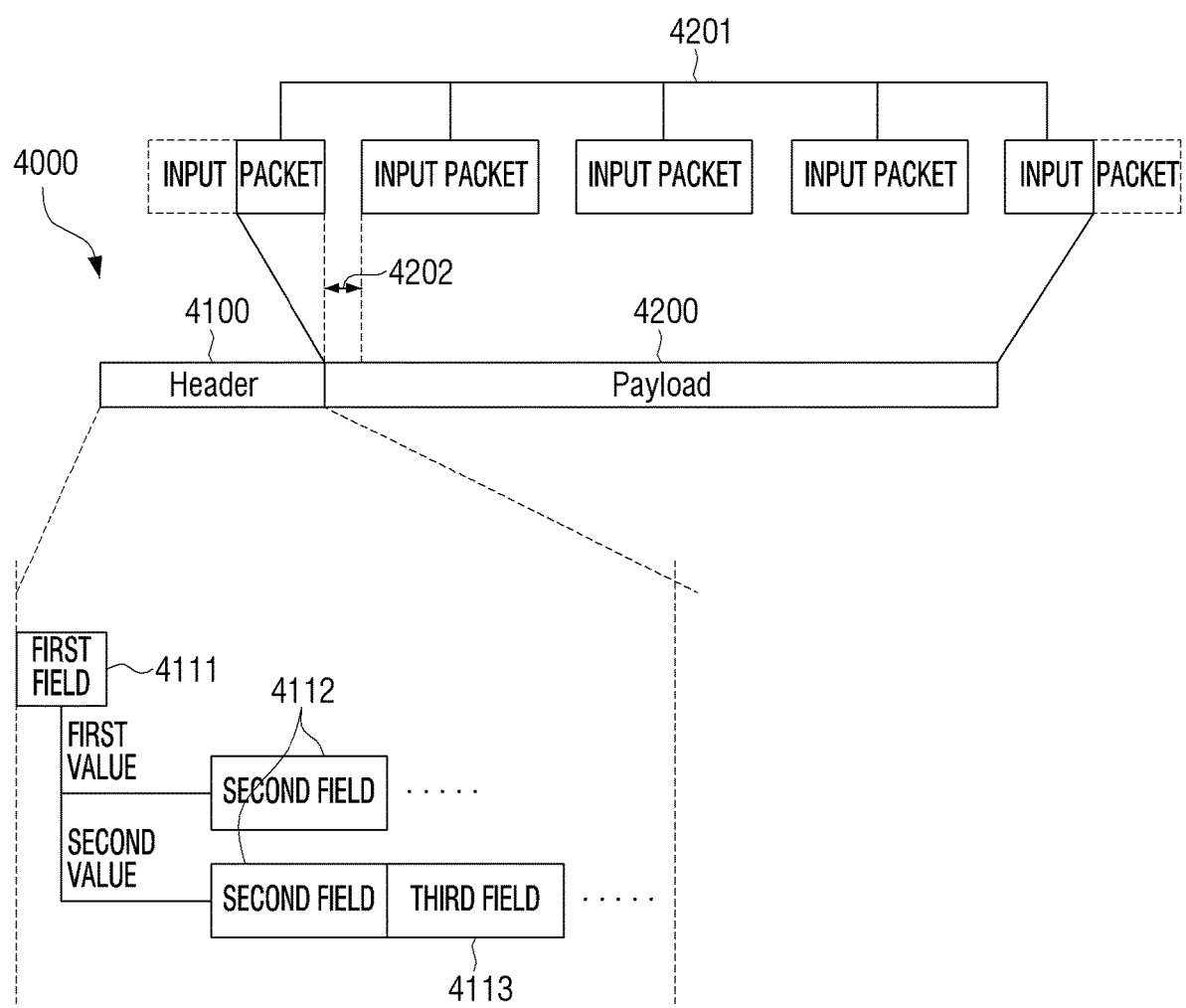
FIG. 17 is a diagram illustrating a structure of a packet, according to another exemplary embodiment.

FIG. 17 is a diagram illustrating a structure of a packet according to another exemplary embodiment.

Referring to FIG. 17, a packet 4000 includes a header 4100 and a payload 4200 and a plurality of input packets 4201 may be mapped in the payload 4200 of the packet 4000.

Here, like the first input packet among the plurality of input packets 4201, one input packet is divided to be included in payloads of different packets. In addition, the base field may notify the start point of the input packet through the pointer value. Here, the pointer value means an offset from the start point of the payload to the first start point among the respective start points of the input packets included in the payload.

In detail, a first field 4111 included in the base field of the header 4100 may be set to a first value representing that the base field is a first length, that is, 1 byte or a second value representing that the base field is a second length, that is, 2 bytes.

Particularly, when the first field 4111 is set to the first value and thus the base field is 1 byte, the base field may include only the second field representing LSB of the pointer value representing the first value among respective start points of the input packets included in the payload 4200, and as a result, the pointer value may represent only less than the predetermined value.

In addition, when the first field 4111 is set to the second value and thus the base field is 2 bytes, the base field may include the second field representing the LSB of the pointer value representing the first value among respective start points of the input packets included in the payload and the third field representing the MSB of the pointer value, and as a result, the pointer value may represent even greater than or equal to the predetermined value.

Here, the predetermined value may be 128 bytes, and as a result, when the first field 4111 is set to the first value, the pointer value may represent only less than 128 bytes and when the first field 4111 is set to the second value, the pointer value may represent even greater than or equal to 128 bytes.

For example, when any one input packet is disposed to be matched with the start point of the payload 4200 of the packet 4000, and thus, the start point of the corresponding input packet is the same as the start point of the payload, the pointer value representing the value corresponding to the start point of the corresponding input packet may become 0. That is, since the start point of the input packet may be digitized and calculated based on the start point of the payload 4200, the pointer value representing the value corresponding to the start point of the corresponding input packet which starts the same as the start point of the payload 4200 may become 0.

In addition, as illustrated in FIG. 17, when any one input packet is divided to be included in the payload 4200 like the first input packet among the plurality of input packets 4201, the start point of the first input packet is present in the previous packet and is not present in the corresponding payload 4200, and thus, the first start point of the respective start points of the input packets included in the payload 4200 immediately becomes a start point of the second input packet. Accordingly, the pointer value representing a value corresponding to the start point of the second input packet may immediately become a value corresponding to a distance 4202 to the start point of the second input packet based on the start point of the payload 4200.

In addition, when the first field 4111 is set to the first value, the base field of the header 4100 includes only a second field 4112 representing the LSBs of the pointer value, and when the first field 4111 is set to the second value, the base field of the header 4100 may include the second field 4112 representing the LSBs of the pointer value and a third field 4113 representing the MSBs of the pointer value.

Here, the first field 4111 may be the MODE field and the MODE field may have a size of 1 bit. In addition, when the MODE field is set to 0, the length of the base field represents 1 byte, and when the MODE field is set to 1, the length of the base field may represent 2 bytes.

Further, the MODE field may represent whether the third field 4113 representing the MSBs of the pointer value is present, and whether a fourth field representing an extension mode of the header is present. In detail, when the MODE field is set to 0, it is represented that the base field includes only the second field 4112 representing the LSBs of the pointer value. Here, the second field 4112 may be the pointer (LSB) field representing the LSBs of the pointer value, and the pointer (LSB) field may have a size of 7 bits. Accordingly, when the MODE field is set to 0, the pointer value has no choice but to be represented up to less than 128 bytes, and the base field has the size of 1 byte including the MODE field (1 bit) and the pointer (LSB) field (7 bits).

Further, when the MODE field is set to 1, the base field may include the second field 4112 representing the LSBs of the pointer value and the third field 4113 representing the MSBs of the pointer value. Here, the third field 4113 representing the MSBs of the pointer value may be the pointer (MSB) field and the pointer (MSB) field may have a size of 6 bits. Accordingly, when the MODE field is set to 1, the pointer value may be extended and represented up to 8191 bytes through a total of 13 bits obtained by summing up the pointer (MSB) field (7 bits) and the pointer (MSB) field (6 bits), and the base field has a size of 2 bytes including the MODE field (1 bit), up the pointer (LSB) field (7 bits), the pointer (MSB) field (6 bits), and the fourth field (2 bits) representing the extension mode of the header 4100 to be described below. As a result, the pointer (MSB) field and the fourth field representing the extension mode of the header 4100 may be included in the base field only when the MODE field is set to 1.

Accordingly, when the pointer value representing the first value among the start points of the input packets in the payload 4200 of the packet 4000 is less than 128 bytes, the first field 4111, that is, the MODE field is set to 0 and the base field includes the second field 4112, that is, only the pointer (LSB) field, and thus, the base field has the size of 1 byte. When the pointer value representing the first value among the start points of the input packets in the payload 4200 of the packet 4000 is equal to or greater than 128 bytes, the first field 4111, that is, the MODE field is set to 1 and the base field includes the second field 4112, that is, the pointer (LSB) field, the third field 4113, that is, the pointer (MSB) field, and the fourth field, and thus, the base field has the size of total 2 bytes.

In addition, when the start point of the input packet in the payload 4200 of the packet 4000 is not present, since the value corresponding to the start point of the corresponding input packet may not be defined, the pointer value becomes 8191 and accordingly, the MODE field is set to 1 and the base field has the size of 2 bytes.

Further, even when in the payload 4200 of the packet 4000, the input packet is not present and only the padding is present, the pointer value becomes 8191 and accordingly, the MODE field is set to 1 and the base field has the size of 2 bytes.

Figure 18:
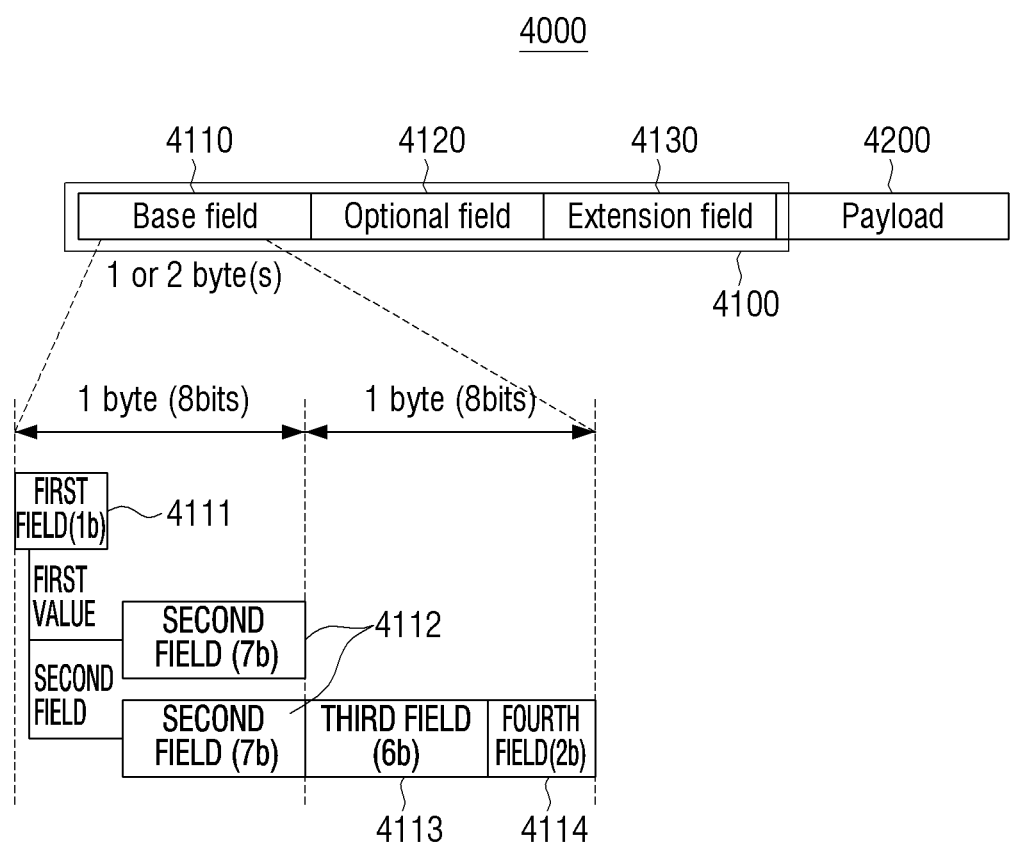
FIG. 18 is a diagram illustrating a detailed configuration of a header illustrated in FIG. 17, according to an exemplary embodiment.

FIG. 18 is a diagram illustrating a detailed configuration of the header illustrated in FIG. 17, according to an exemplary embodiment. Referring to FIG. 18, as described above, the header 4100 includes a base field 4110, and may further include an optional field 4120 and an extension field 4130, and whether a fourth field 4114 representing the extension mode of the header 4100 to be described below is included may be determined.

In addition, as described above, when the first field 4111 is set to the first value, the base field 4110 includes only the second field 4112, and accordingly, it can be seen that the length of the base field 4110 has the size of total 1 byte including 1 bit of the first field 4111 and 7 bits of the second field 4112.

Further, as described above, when the first field 4111 is set to the second value, the base field 4110 includes the second field 4112, the third field 4113, and the fourth field 4114 representing the extension mode of the header 4110, and accordingly, it can be seen that the length of the base field 4110 has the size of total 2 bytes including 1 bit of the first field 4111, 7 bits of the second field 4112, 6 bits of the third field 4113, and 2 bits of the fourth field 4114.

Meanwhile, when the first field 4111 is set to the second value, the base field 4110 includes the fourth field 4114 representing the extension mode of the header 4110, and the fourth field 4114 may include at least one of information about whether the optional field 4120 and the extension field 4130 are present, the length of the optional field 4120, and the structure of the extension field 4130.

In detail, the fourth field 4114 may be set to one of a third value representing that the optional field 4120 and the extension field 4130 are not present, a fourth value representing that the optional field 4120 is present and the length of the optional field 4120 is 1 byte, a fifth value representing that the optional field 4120 is present and the length of the optional field 4120 is 2 bytes, and a sixth value representing the optional field 4120 is present, the length of the optional field 4120 is 2 bytes, and the extension field 4130 has a structure to include a plurality of extension payloads.

Here, the fourth field 4114 may be an OFI field and the OFI field may have a size of 2 bits. In detail, the information represented by values set in the OFI field may be summarized like in following Table 2.

TABLE 2

| OFI | Content |
| --- | --- |
| 00 | No Extension Mode: Optional field and extension field are not present. |
| 01 | Short Extension Mode: Optional field is present and length of optional field is 1 byte. |
| 10 | Long Extension Mode: Optional field is present and length of optional field is 2 bytes. |
| 11 | Mixed Extension Mode: Structure in which optional field is present, length of optional field is 2 bytes, and extension field includes a plurality of extension payloads. |

In detail, how the optional field 4130 and the extension field 4130 are included in the header 4100 according to the value set in the fourth field 4114 will be described with reference to FIG. 19.

Figure 19:
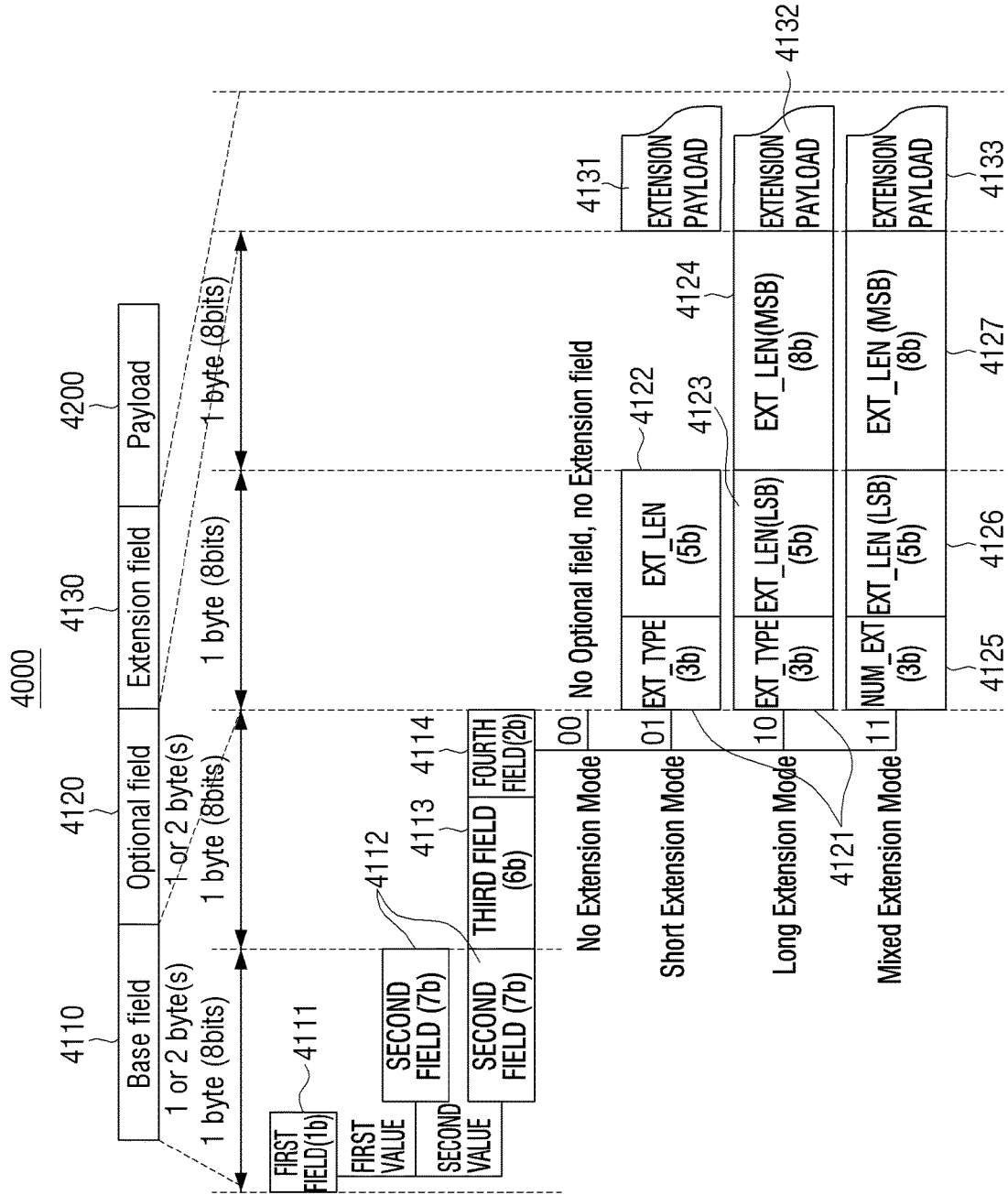
FIG. 19 is a diagram illustrating a detailed configuration of an optional field, according to another exemplary embodiment.

FIG. 19 is a diagram illustrating a detailed configuration of an optional field according to another exemplary embodiment.

Referring to FIG. 19, when the fourth field is set to "00" which is the third value, the header 4100 includes only the base field 4110 and does not include the optional field 4120 and the extension field 4120.

Further, when the fourth field is set to "01" which is the fourth value, as a short extension mode, the header 4100 may further include the optional field 4120 having a size of 1 byte other than the base field 4110. In addition, the presence or absence and the length of the extension field 4130 may be determined by fields included in the optional field 4120.

In detail, the optional field 4120 may include a field 4121 (EXT_TYPE field) representing a type of an extension payload 4131 included in the extension field 4130 and a field 4122 (EXT_LEN field) representing a length of the extension field 4130. Here, the EXT_TYPE field 4121 will be defined as a fifth field and the EXT_LEN field 4122 will be defined as a sixth field.

Here, the EXT_TYPE field 4121 has a size of 3 bits and represents the type of the extension payload 4131 included in the extension field 4130, and the detailed description thereof will be described below. Further, the EXT_LEN field 4122 has a size of 5 bits and may represent a length of the extension field 4130 in a range of 0 to 31 bytes.

When the EXT_LEN field 4122 is 0, the length of the extension field 4130 is 0, and thus, the extension field 4130 is not present in the header 4100.

In FIG. 19, it is illustrated that when the fourth field 4114 is set to "01" which is the fourth value, the EXT_LEN field 4122 included in the optional field 4120 and the extension payload 4131 included in the extension field 4130 are separated from each other. However, in order to describe that there is a case where the optional field 4120 has the size of 1 byte and there is a case where the optional field 4120 has the size of 2 bytes, the two fields are separated in the drawing. Actually, when the fourth field 4114 is set to "01" which is the fourth value, the optional field 4120 has the size of 1 byte and thus, the extension field 4130 is added subsequently to the optional field 4120. Accordingly, the EXT_LEN field 4122 included in the optional field 4120 and the extension payload 4131 included in the extension field 4130 are disposed next to each other.

Further, when the fourth field 4114 is set to "10" which is the fifth value, as a long extension mode, the header 4100 may further include the optional field 4120 having a size of 2 bytes other than the base field 4110. In addition, the presence or absence and the length of the extension field 4130 may be determined by fields included in the optional field 4120.

In detail, the optional field 4120 may include a field (EXT_TYPE field) 4121 representing a type of the extension payload 4132 included in the extension field 4130, a field (EXT_LEN (LSB) field) 4123 representing an LSB part of a length of the extension field 4130, and a field (EXT_LEN (MSB) field) 4124 representing an MSB part of the length of the extension field 4130. Here, as described above, since the EXT_TYPE field 4121 is defined as a fifth field and the field representing the length of the extension field 4130 is defined as a sixth field, the EXT_LEN (LSB) field 4123 may be defined to represent the LSB part of the sixth field and the EXT_LEN(MSB) field 4124 may be defined to represent the MSB part of the sixth field.

Here, the EXT_TYPE field 4121 has a size of 3 bits and represents the type of the extension payload 4132 included in the extension field 4130, and the detailed description thereof will be described below.

Further, the EXT_LEN (LSB) field 4123 may has a size of 5 bit of the LSB part among total 13 bits for representing the length of the extension field 4130, and the EXT_LEN (MSB) field 4124 may have a size of 8 bits of the MSB part among total 13 bits for representing the length of the extension field 4130. In addition, the field of total 13 bits connecting the EXT_LEN (LSB) field 4123 and the EXT_LEN (MSB) field 4124 may represent the length of the extension field 4130 in the entire length range of the packet 4000 from 0.

Of course, when the field of total 13 bits connecting the EXT_LEN (LSB) field 4123 and the EXT_LEN (MSB) field 4124 is 0, the length of the extension field is 0, and thus, the extension field 4130 is not present in the header 4100.

Further, when the fourth field is set to "11" which is the sixth value, as a mixed extension mode, the header 4100 may further include the optional field 4120 having a size of 2 bytes other than the base field 4110. In addition, the presence or absence and the length of the extension field 4130 and the structure of the extension field 4130 may be determined by fields included in the optional field 4120.

In detail, the optional field 4120 may include a field (NUM_EXT field) 4125 representing the number of a plurality of extension payloads 4133 included in the extension field 4130, a field (EXT_LEN(LSB) field) 4126 representing the LSB part of the length of the extension field 4130, and a field (EXT_LEN(MSB) field) 4127 representing the MSB part of the length of the extension field 4130.

Here, the NUM_EXT field 4125 has a size of 3 bits and may represent the number of the plurality of extension payloads 4133 other than padding included in the extension field 4130.

Particularly, the extension field 4130 may indicate presence of two to seven extension payloads, and the detailed structure thereof will be described with reference to FIG. 25.

Further, the EXT_LEN (LSB) field 4126 may has a size of 5 bits of the LSB part among total 13 bits for representing the length of the extension field 4130, and the EXT_LEN (MSB) field 4127 may have a size of 8 bits of the MSB part among total 13 bits for representing the length of the extension field 4130.

Meanwhile, the length of the extension field 4130 which may be represented by the field of total 13 bits connecting the EXT_LEN (LSB) field 4126 and the EXT_LEN(MSB) field 4127 will be described together while describing the structure of the extension field 4130.

Figure 25:
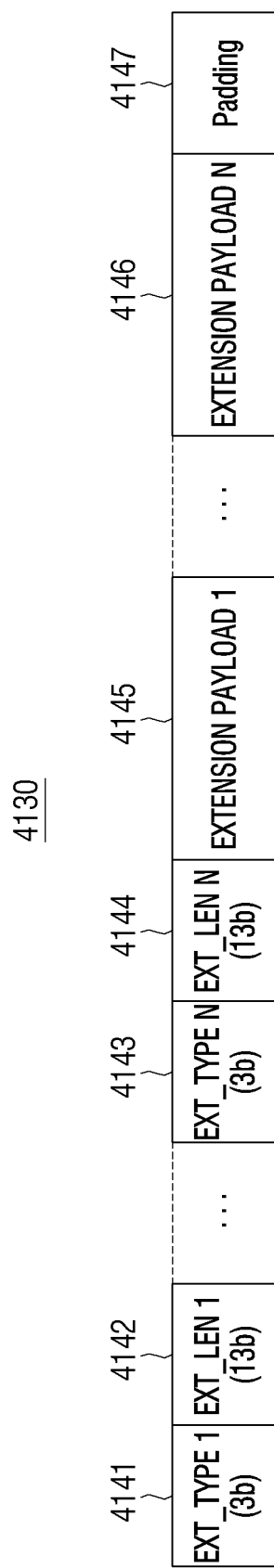
FIG. 25 is a diagram illustrating a structure of an extension field, according to an exemplary embodiment.

FIG. 25 is a diagram illustrating a structure of the extension field according to an exemplary embodiment.

When the fourth field 4114 is set to the sixth value, the extension field 4130 may include a plurality of fields representing respective types of the plurality of extension payloads and a plurality of fields representing respective lengths of the plurality of extension payloads.

In detail, referring to FIG. 25, when the fourth field 4114 is set to the sixth value, that is, "11", this means a mixed extension mode, and accordingly, the extension field 4130 may include the plurality of extension payloads Extension payload 1 (4145), . . . , Extension payload N (4146). In this case, the extension field 4130 may include a plurality of fields EXT_TYPE 1 (4141), . . . , EXT_TYPE N (4143) representing respective types of the plurality of extension payloads Extension payload 1 (4145), . . . , Extension payload N (4146) and a plurality of fields EXT_LEN 1 field (4142), . . . , EXT_LEN N field (4144) representing respective lengths of the plurality of extension payloads Extension payload 1 (4145), . . . , Extension payload N (4146). Here, as described above, since the extension field 4130 may include two to seven extension payloads, a range of N may become from 2 to 7.

The plurality of extension payloads (Extension payload 1 (4145), . . . , Extension payload N (4146)) all do not include the padding.

Further, when one extension payload is included in the extension field 4130, one EXT_TYPE field representing the type of the corresponding extension payload and one EXT_LEN field are included in the extension field 4130. Here, when considering that the EXT_TYPE field has the size of 3 bits and the EXT_LEN field has the size of 13 bits, a header having the size of total 2 bytes with respect to the one extension payload is included in the extension field 4130. Here, the header includes the EXT_TYPE field and the EXT_LEN field, and will be defined by the generic term of fields disposed at the front end of the extension field 4130.

Accordingly, when N extension payloads are included in the extension field 4130, the extension field 4130 includes a header having a size of total 2 N bytes including a plurality of EXT_TYPE fields associated with the respective extension payloads and an EXT_LEN field.

As described above, the extension field 4130 may include at least two extension payloads and as a result, may include a header having a size of 4 bytes. However, when the value of the EXT_LEN field is 0, it can be seen that there is no extension payload, and in this case, the length of the extension field 4130 may have no choice but to be at least 4 bytes.

As a result, the length of the extension field 4130 which may be represented by the field of total 13 bits connecting the EXT_LEN (LSB) field 4126 and the EXT_LEN (MSB) field 4127 described in FIG. 19 may represent the length of the extension field 4130 in a range of the entire length of the packet 4000 from 4 bytes.

Each of EXT_LEN 1 field (4142), . . . , EXT_LEN N field (4144) illustrated in FIG. 25 may include the EXT_LEN (LSB) field having a size of 5 bits and the EXT_LEN (MSB) field having a size of 8 bits. Accordingly, one header having a size of 2 bytes for one extension payload includes an EXT_TYPE field having a size of 3 bits, an EXT_LEN (LSB) field having a size of 5 bits, and an EXT_LEN (MSB) field having a size of 8 bits.

Further, in the extension field 4130, when the fourth field 4114 is set to one of the fourth value and the fifth value, the length of the extension payload included in the extension field 4130 is smaller than the length of the extension field 4130, the extension payload is included in the extension field 4130 and the padding may be included in the remaining part.

For example, in FIG. 19, when the fourth field 4114 is set to "01" which is the fourth value and an actual length of the extension payload 4131 included in the extension field 4130 is smaller than the length of the extension field 4130 defined by the EXT_LEN field 4122, the extension field 4130 includes the extension payload 4131 and the padding may be included in the remaining part of the extension field 4130. Here, the padding means meaningless data, and the meaningless data may be randomly determined by various methods according to a system design. Further, the padding is not required to be filled only with 0, may be filled only with 1, and may be filled with a meaningless combination of 0 and 1. However, a case where the padding according to the exemplary embodiment is filled only with 0 will be described as an example.

Further, for example, in FIG. 19, when the fourth field 4114 is set to "10" which is the fifth value and an actual length of the extension payload 4132 included in the extension field 4123 is smaller than the length of the extension field 4130 defined by the EXT_LEN (LSB) field 4123 and the EXT_LEN (MSB) field 4124, the extension field 4130 includes the extension payload 4132 and the padding may be included in the remaining part of the extension field 4130.

Meanwhile, in the extension field 4130, when the fourth field 4114 is set to the sixth value, the plurality of extension payloads are included in the extension field 4130 and the padding may be included in the remaining part.

For example, referring to FIG. 25, when the fourth field 4114 is set to "11" which is the sixth value, in the case where a total actual length of the plurality of fields EXT_TYPE 1 (4141), . . . , EXT_TYPE N (4143) representing the respective types of the plurality of extension payloads Extension payload 1 (4145), . . . , Extension payload N (4146) included in the extension field 4130, the plurality of fields EXT_LEN 1 field (4142), . . . , EXT_LEN N field (4144) representing the respective lengths of the plurality of extension payloads Extension payload 1 (4145), . . . , Extension payload N (4146), and the plurality of payloads Extension payload 1 (4145), . . . , Extension payload N (4146) is smaller than the length of the extension field 4130 defined by the EXT_LEN (LSB) field 4126 and the EXT_LEN (MSB) field 4127, the extension field 4130 includes the plurality of fields EXT_TYPE 1 (4141), . . . , EXT_TYPE N (4143) representing the respective types of the plurality of extension payloads, the plurality of fields EXT_LEN 1 field (4142), . . . , EXT_LEN N field (4144) representing the respective lengths of the plurality of extension payloads, and the plurality of payloads Extension payload 1 (4145), . . . , Extension payload N (4146) and the padding may be included in the remaining part.

Meanwhile, how the structure of the packet 4000 is entirely changed according to the values set in the first field 4111 and the fourth field 4114 will be described with reference to FIGS. 20 to 24.

FIGS. 20 to 24 are diagrams illustrating structures of a packet according to various exemplary embodiments.

Figure 20:
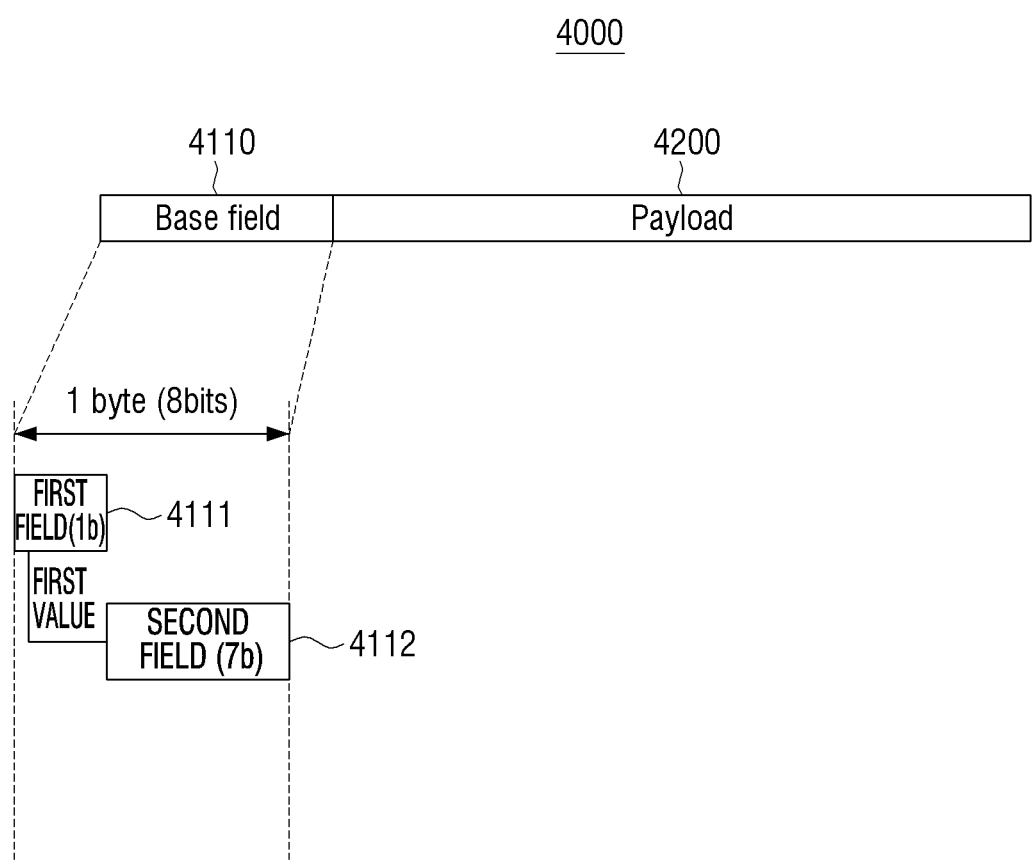
FIGS. 20 to 24 are diagrams illustrating structures of a packet, according to exemplary embodiments.

Referring to FIG. 20, when the first field 4111 is set to the first value, the base field 4110 includes only the second field 4112 representing the LSBs of the pointer value, and the optional field 4120 and the extension field 4130 are not included in the packet 4000, and as a result, the packet 4000 includes the base field 4110 having a size of 1 byte and the payload 4200.

Figure 21:
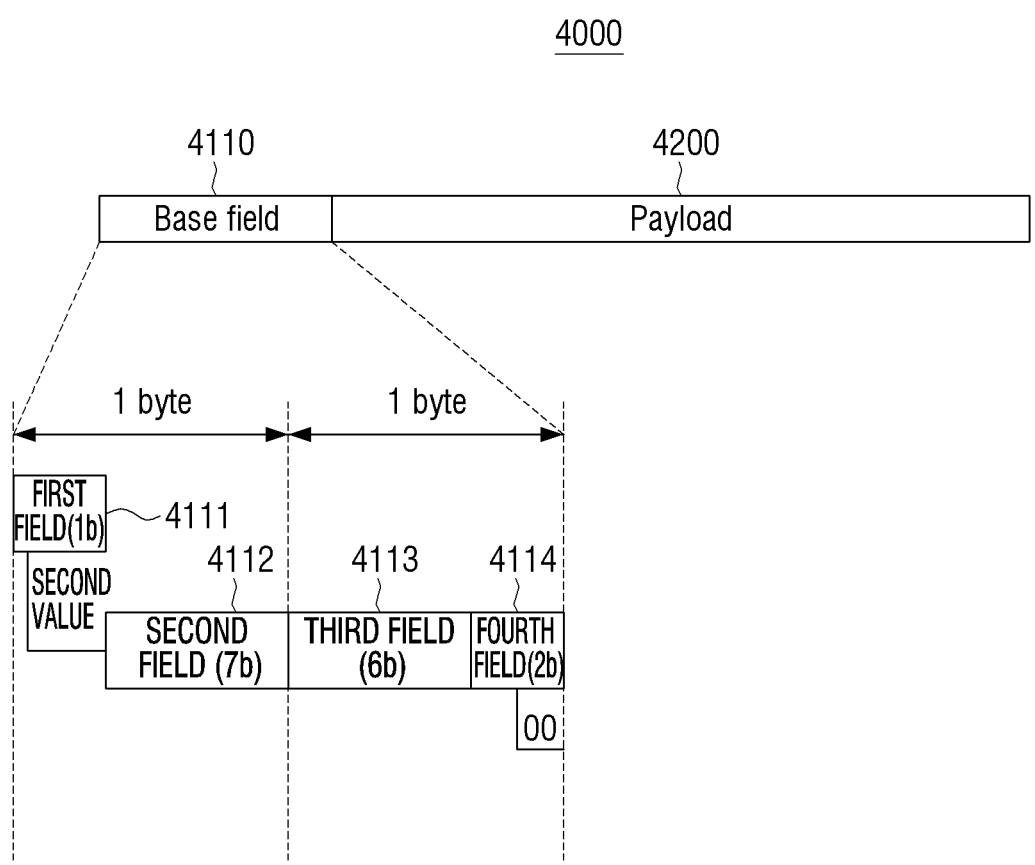

Referring to FIG. 21, when the first field 4111 is set to the second value, the base field 4110 includes a second field 4112 representing the LSBs of the pointer value and a third field 4113 representing the MSBs of the pointer value, and may additionally include a fourth field 4114 representing an extension mode of the header 4100.

Accordingly, the packet 4000 includes the base field 4110 having the length of 2 bytes. However, in FIG. 21, since the fourth field 4114 is set to the third value, that is, "00", the optional field 4120 and the extension field 4130 are not included in the packet 4000, and as a result, the packet 4000 includes the base field 4110 having a size of 2 bytes and the payload 4200.

Figure 22:
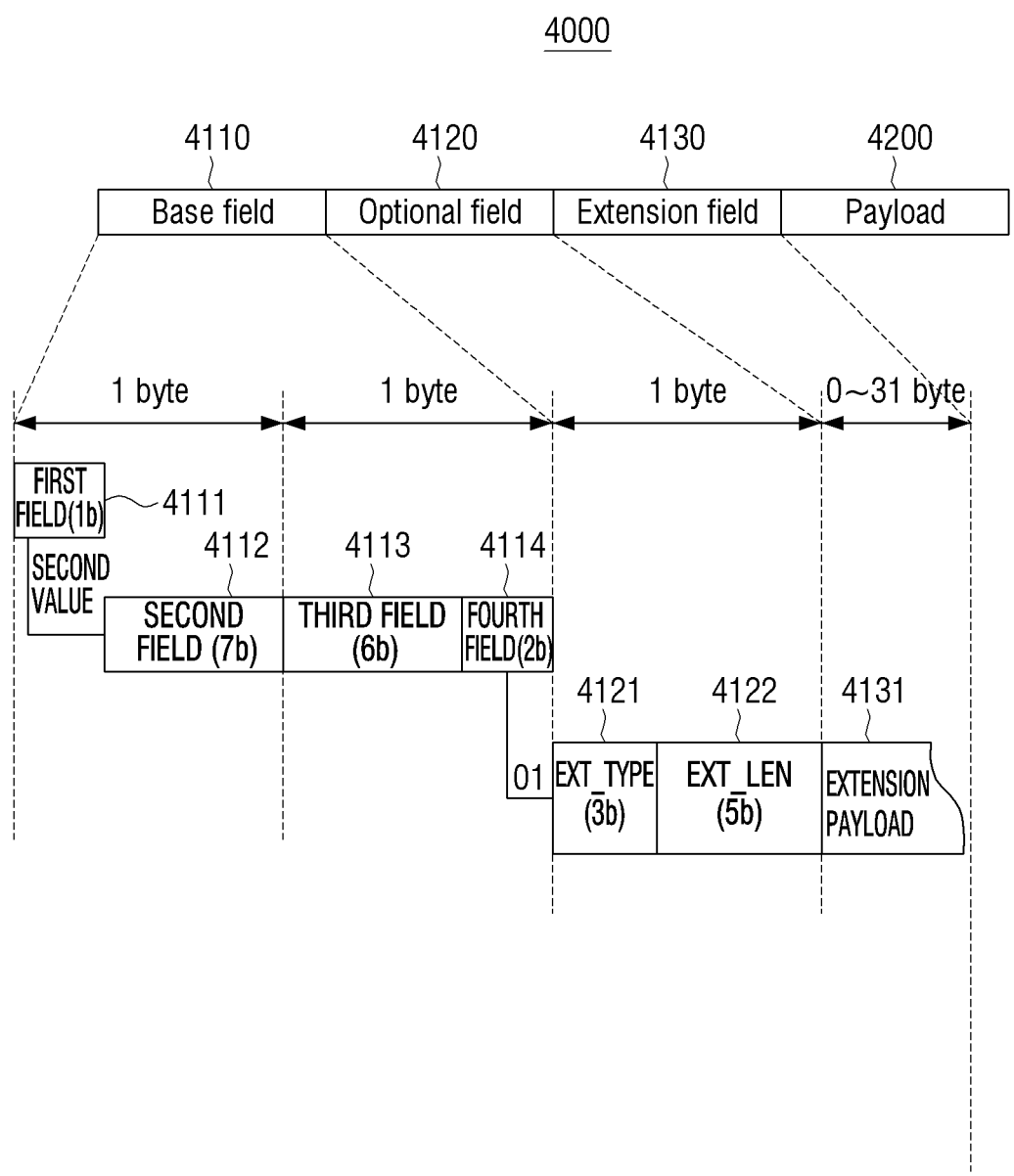

Referring to FIG. 22, when the first field 4111 is set to the second value, the base field 4110 includes a second field 4112 representing the LSBs of the pointer value and a third field 4113 representing the MSBs of the pointer value, and may additionally include a fourth field 4114 representing an extension mode of the header 4100.

Accordingly, the packet 4000 includes the base field 4110 having the length of 2 bytes. However, in FIG. 22, since the fourth field 4114 is set to the fourth value, that is, "01", the optional field 4120 having a size of 1 byte and the extension field 4130 having a size of 1 to 31 bytes are included in the packet 4000. As a result, the packet 4000 includes the base field 4110 having the size of 2 bytes, the optional field 4120 having the size of 1 byte, the extension field 4130 having the size of 1 to 31 bytes, and the payload 4200. Further, the optional field 4120 may include an EXT_TYPE field 4121 and an EXT_LEN field 4122.

Figure 23:
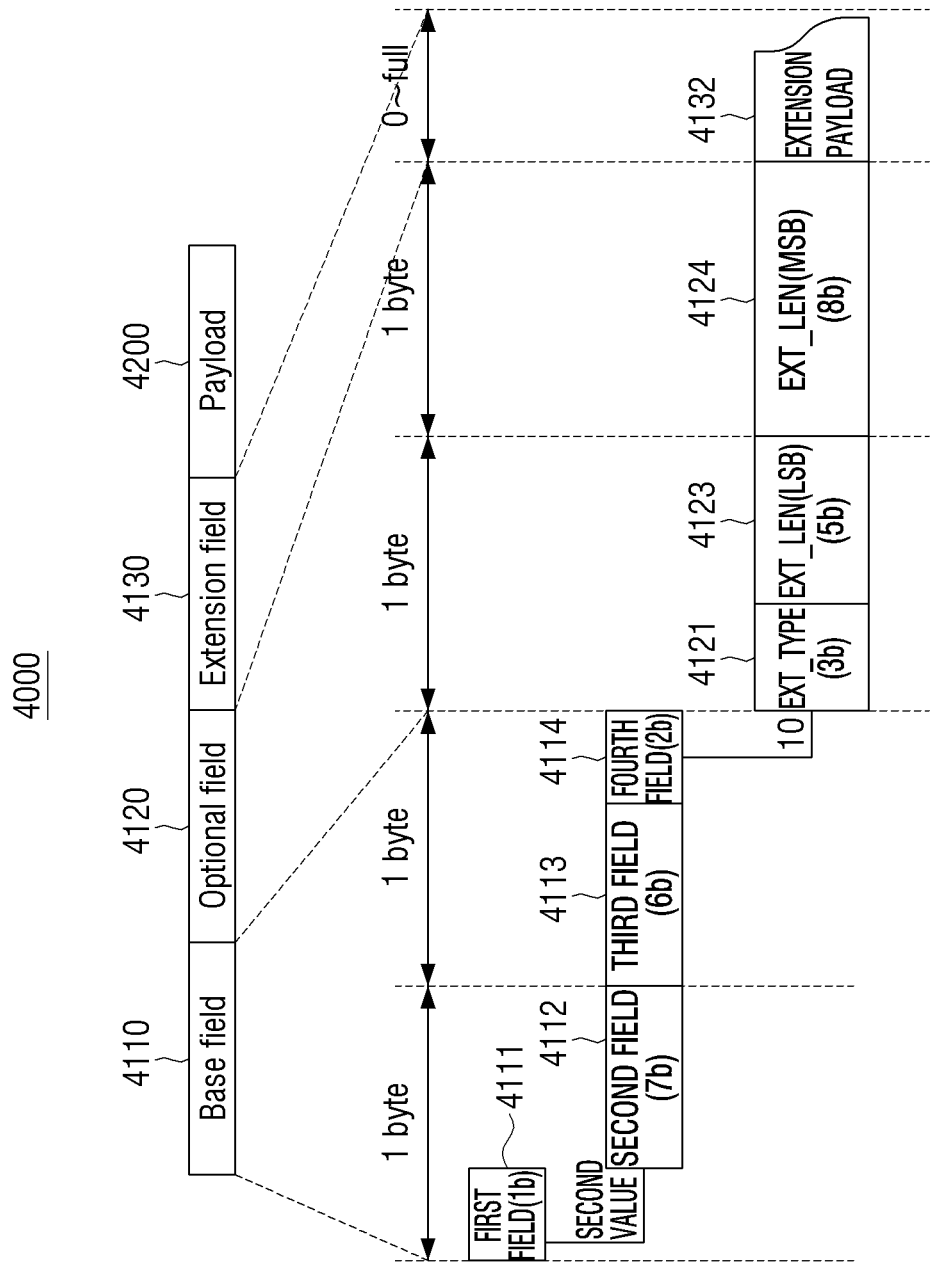

Referring to FIG. 23, when the first field 4111 is set to the second value, the base field 4110 includes a second field 4112 representing the LSBs of the pointer value and a third field 4113 representing the MSBs of the pointer value, and may additionally include a fourth field 4114 representing an extension mode of the header 4100.

Accordingly, the packet 4000 includes the base field 4110 having the length of 2 bytes. However, in FIG. 23, since the fourth field 4114 is set to the fifth value, that is, "10", the optional field 4120 having a size of 2 bytes and the extension field 4130 are included in the packet 4000. Here, the length of the extension field 4130 may be defined by the EXT_LEN (LSB) field 4123 and the EXT_LEN (MSB) field 4124 included in the optional field 4120 and may be from 0 to $2^{13}$-1 bytes. Further, the optional field 4120 may include the EXT_TYPE field 4121, the EXT_LEN (LSB) field 4123, and the EXT_LEN (MSB) field 4124.

Figure 24:
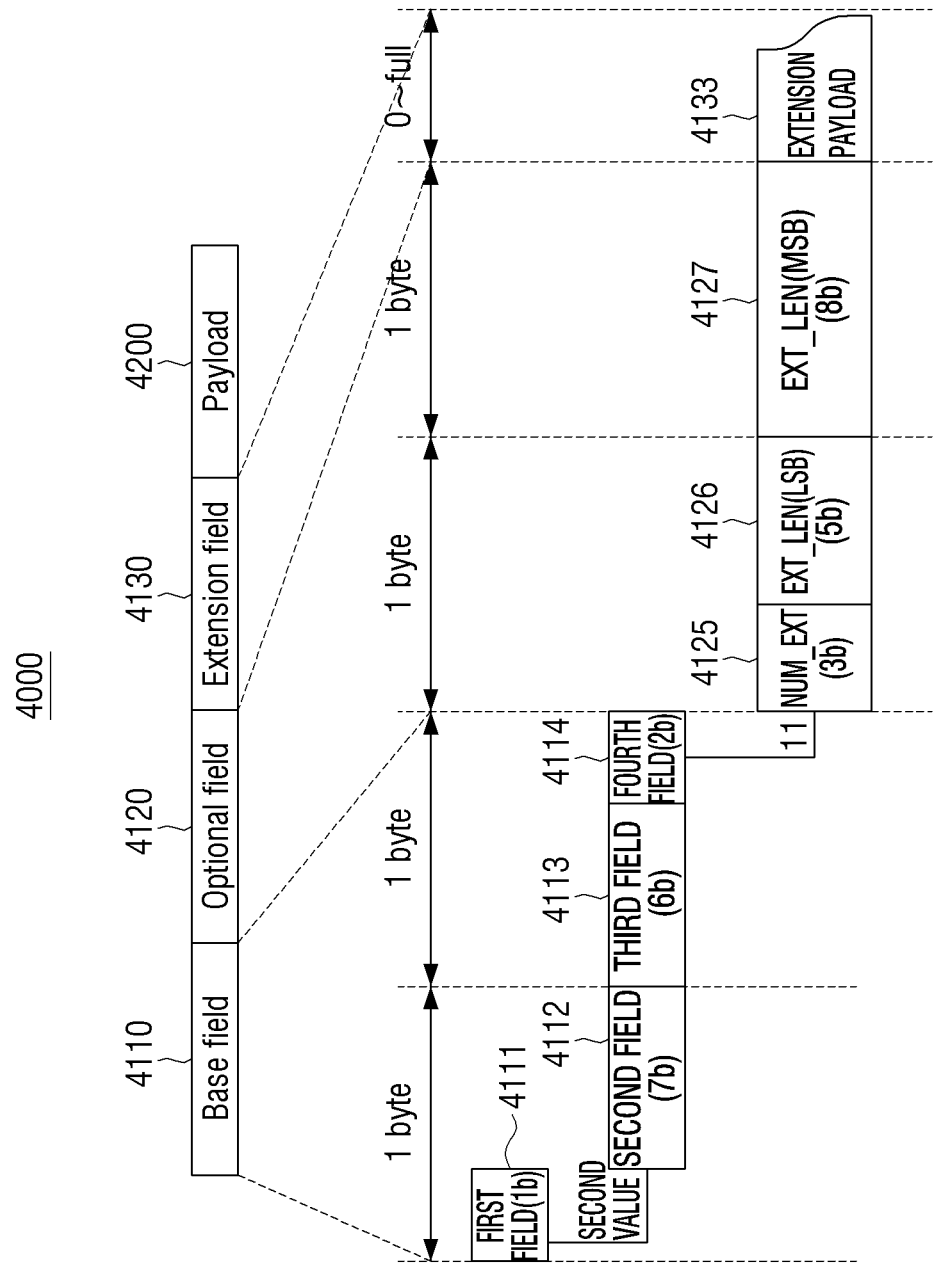

Referring to FIG. 24, when the first field 4111 is set to the second value, the base field 4110 includes a second field 4112 representing the LSBs of the pointer value and a third field 4113 representing the MSBs of the pointer value, and may additionally include a fourth field 4114 representing an extension mode of the header 4100.

Accordingly, the packet 4000 includes the base header 4110 having the length of 2 bytes. However, in FIG. 24, since the fourth field 4114 is set to the sixth value, that is, "11", the optional field 4120 having a size of 2 bytes and the extension field 4130 are included in the packet 4000. Here, the length of the extension field 4130 may be defined by the EXT_LEN (LSB) field 4126 and the EXT_LEN (MSB) field 4127 included in the optional field 4127 and may be from 0 to $2^{13}$-1 bytes. Further, the optional field 4120 may include the NUM_EXT field 4125, the EXT_LEN (LSB) field 4126, and the EXT_LEN (MSB) field 4127. In addition, the extension field 4130 may include the plurality of extension payloads, and the detailed description thereof is described in FIG. 25 in advance and will be omitted.

The EXT_TYPE field 4121 included in the optional field 4120 represents types of the extension payloads 4131 and 4132 included in the extension field 4130, and may be used to perform various functions according to the predetermined value. For example, different information according to the value set in the EXT_TYPE field is illustrated like the following Table 3.

TABLE 3

| EXT_TYPE | Description |
|---|---|
| 000 | Counter |
| 001-110 | These fields are reserved for future extension types |
| 111 | Padding |
| | All bytes of extension field are padded with 0x00 |

In detail, when the EXT_TYPE field 4121 is set to "000", a counter function may be performed, and in detail, a predetermined field having a size by a value included in the EXT_LEN field may be included in the extension field 4130 as an extension payload. Here, the predetermined field may perform a function of numbering and identifying a plurality of packets included in a current PLP one by one and the counter value may be linearly increased from 0.

For example, when the fourth field 4114 is set to the fourth value, that is, "01" and the EXT_LEN field includes the value of 1, the predetermined field has the size of 1 byte and as a result, the counter value may have values of 0 to 255.

Here, the predetermined field performing the counter function may be independently used with respect to each PLP, and when the counter value reaches a maximum value, the counter value of the next packet is reset to 0 and increased again.

Further, with respect to the PLP to which channel bonding is applied, a single counter, that is, a single predetermined field may be used for increasing a counter value in the packet, and this may be performed before the packet is assigned to a specific RF channel.

The aforementioned content may be applied even to EXT_TYPE 1 (4141), . . . , EXT_TYPE N (4143) included in the extension field 4130 when the fourth field 4114 is set to the sixth value, that is, "11".

When the fourth field 4114 is set to one of the fourth value, that is, "01" and the fifth value, that is, "10" and the EXT_TYPE field 4121 is set to "111", all of the extension fields 4130 are filled with padding.

In detail, when the first field 4114 is set to the fourth value, that is, "01" or the fifth value, that is, "10", the optional field 4120 further includes a fifth field representing the type of extension payload included in the extension field 4130, that is, the EXT_TYPE field 4121 and a sixth field representing the length of the extension field 4130 (which means the EXT_LEN field 4122 when the fourth field 4114 is the fourth value and the EXT_LEN(LSB) field 4123 and the EXT_LEN(MSB) field 4124 when the fourth field 4114 is the fifth value), and when the fifth field, that is, the EXT_TYPE field 4121 is set to the predetermined value, the extension field 4130 may be completely filled by padding.

For example, when the fifth field, that is, the EXT_TYPE field 4121 is set to "111", this means that the extension field 4130 is completely filled by padding as defined in Table 3, and as a result, the extension field 4130 is completely filled by padding.

For example, in the case where the fourth field 4114 is set to the fourth value, that is, "01" and the EXT_LEN field 4122 includes a value representing that the length of the extension field 4130 is 0 byte, as compared with a case where the fourth field 4114 is set to the third value, that is, "00", padding of 1 byte is included in the header 4100. That is, the optional field 4120 of 1 byte serves as the padding of 1 byte.

Further, in the case where the fourth field 4114 is set to the fifth value, that is, "10" and the EXT_LEN (LSB) field 4123 and the EXT_LEN (MSB) field 4124 include a value representing that the length of the extension field 4130 is 0 byte, as compared with a case where the fourth field 4114 is set to the third value, that is, "00", padding of 2 bytes is included in the header 4100. That is, the optional field 4120 of 2 bytes serves as the padding of 2 byte.

When the fourth field 4114 is set to the sixth value, that is, "11", as described above, the extension field 4130 is filled with a plurality of extension payloads and the remaining part may be filled with the padding. In this case, it is not required that EXT_TYPE 1 (4141), . . . , EXT_TYPE N (4143) are separately set to "111".

Figure 26A:
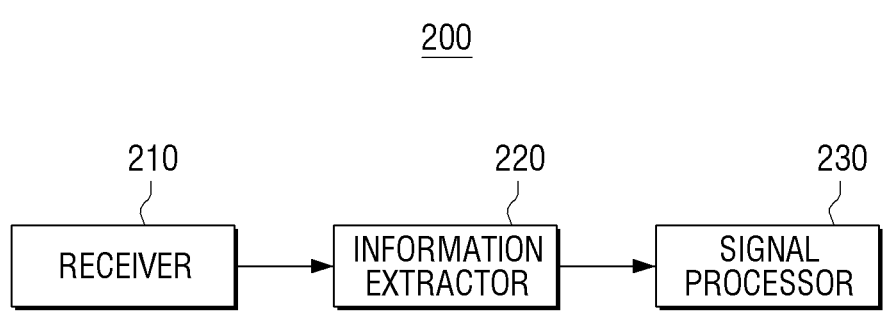
FIG. 26A is a block diagram illustrating a configuration of a receiving apparatus, according to an exemplary embodiment.

FIG. 26A is a block diagram illustrating a configuration of a receiving apparatus according to an exemplary embodiment.

Referring to FIG. 26A, the receiving apparatus 200 includes a receiver 210, an information extractor 220, and a signal processor 220.

The receiving apparatus 200 may be implemented to receive data a the transmitting apparatus mapping and transmitting data included in an input stream on at least one signal processing path.

The receiver 210 may receive the input stream including a packet including a header and a payload. That is, receiver 210 receives a transmission frame including the data mapped on at least one signal processing path. In detail, the receiver 210 may receive signaling information and the stream including the data mapped on at least one signal processing path. Here, the signaling information may include information about an input type of the input stream input to the receiving apparatus and information about a data type mapped on at least one signal processing path. Here, the information about the input type of the input stream may represent whether all of the signal processing paths in the frame are the same input type. In addition, the detailed information included in the signaling information is described above and the detailed description will be omitted.

The information extractor 220 extracts the header from the packet and may extract information representing the start point of a data packet in the payload and information about whether an additional field is present from the extracted header.

With respect to the information representing the start point of the data packet in the payload included in the header and the information about whether the additional field is present, the part for the transmitting apparatus 100 is described in advance and the detailed description will be omitted.

The signal processor 230 may signal-process the data packet included in the payload based on the information representing the start point of the extracted data packet and the information about whether an additional field is present. That is, the start point of the data packet in the payload is accurately detected based on the information representing the start point of the data packet and decoding may be performed from the start point of the data packet. Further, the signal processor 230 may determine whether the received packet includes an optional field and an extension field based on the information about whether the additional field is present and detect information required for signal-processing the data packet from the optional field and the extension field.

Here, the information representing the start point of the data packet may include information about whether an MSB part is present according to a distance between the start point of the payload and the start point of the data packet.

Further, the information about whether the additional field is present may include information representing whether at least one of the optional field and the extension field is present and the length of the optional field and the extension field.

Further, the optional field may include information representing whether at least one of the optional field and the extension field includes padding.

Further, the signal processor 230 extracts signaling information from the received frame. Particularly, the signal processor 230 extracts and decodes L1 signaling to obtain various information about a corresponding PLP included in an L1 pre signaling area and an L1 post signaling area. Further, the signal processor 230 may signal-process the frame based on the extracted signaling information. For example, the signal processing may perform demodulation, frame de-building, BICM decoding, and input de-processing.

In detail, the signal processor 230 generates a baseband packet by signal-processing the frame received through the receiver 210 and extracts header information from the generated baseband packet.

In addition, the signal processor 230 may restore the stream, that is, the input stream initially input to the aforementioned transmitting apparatus 100 by signal-processing the payload data included in the baseband packet based on the extracted header information.

Meanwhile, a receiving apparatus 200 according to another exemplary embodiment includes a receiver 210, an information extractor 220, and a signal processor 230, the receiver 210 includes a packet including a header and a payload, the information extractor 220 may extract the header from the packet and extract information included in the header, and the signal processor 230 may signal-process the input packet included in the payload based on the extracted information. Here, the detailed description for the receiver 210, the information extractor 220, and the signal processor 230 is described above and the detailed description will be omitted.

Further, the header includes a first field set to a first value representing that a pointer value indicating a first start point among the respective start points of the input packets included in the payload is less than the predetermined value or a second value representing that the pointer value is equal to or greater than the predetermined value. When the first field is set to the second value, the header may include a second field representing the LSBs of the pointer value and a third field representing the MSBs of the pointer value.

Figure 26B:
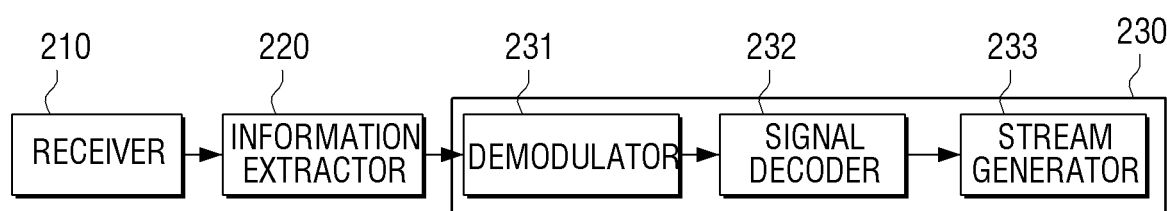
FIG. 26B is a block diagram illustrating a signal processor, according to an exemplary embodiment in detail.

FIG. 26B is a block diagram provided to explain in detail a signal processor according to an exemplary embodiment.

Referring to FIG. 26B, the signal processor 230 includes a demodulator 231, a decoder 232 and a stream generator 233.

The demodulator 231 performs demodulation according to OFDM parameters from the received RF signals, performs sync-detection, and recognizes whether a currently received frame includes necessary service data when the sync is detected from signaling information stored in a sync area. For example, the demodulator 221 may recognize whether a mobile frame is received or a fixed frame is received.

In this case, if OFDM parameters are not previously determined regarding a signaling area and a data area, the demodulator 221 may perform demodulation by obtaining OFDM parameters regarding the signaling area and the data area stored in the sync area, and obtaining information about OFDM parameters regarding the signaling area and the data area which are disposed right after the sync area.

The decoder 232 performs decoding of necessary data. In this case, the decoder 232 may perform decoding by obtaining parameters of an FEC method and a modulating method regarding the data stored in each data area based on the signaling information. Further, the decoder 232 may calculate positions of necessary data based on the data information included in a configurable field and a dynamic field. Thus, it may calculate which positions of the frame a requested PLP is transmitted.

The stream generator 233 may generate data to be served by processing a baseband packet input from the decoder 232.

For example, the stream generator 233 may generate an ALP packet from the baseband packet in which errors are corrected based on an ISSY mode, buffer size (BUFS), time to output (TTO) values and input stream clock reference (ISCR) values.

Specifically, the stream generator 233 may include de jitter buffers. The de jitter buffers may regenerate correct timing to restore an output stream based on the ISSY mode, BUFS, TTO values and ISCR values. Thereby, a delay for sync between a plurality of PLPs can be compensated.

Figure 27:
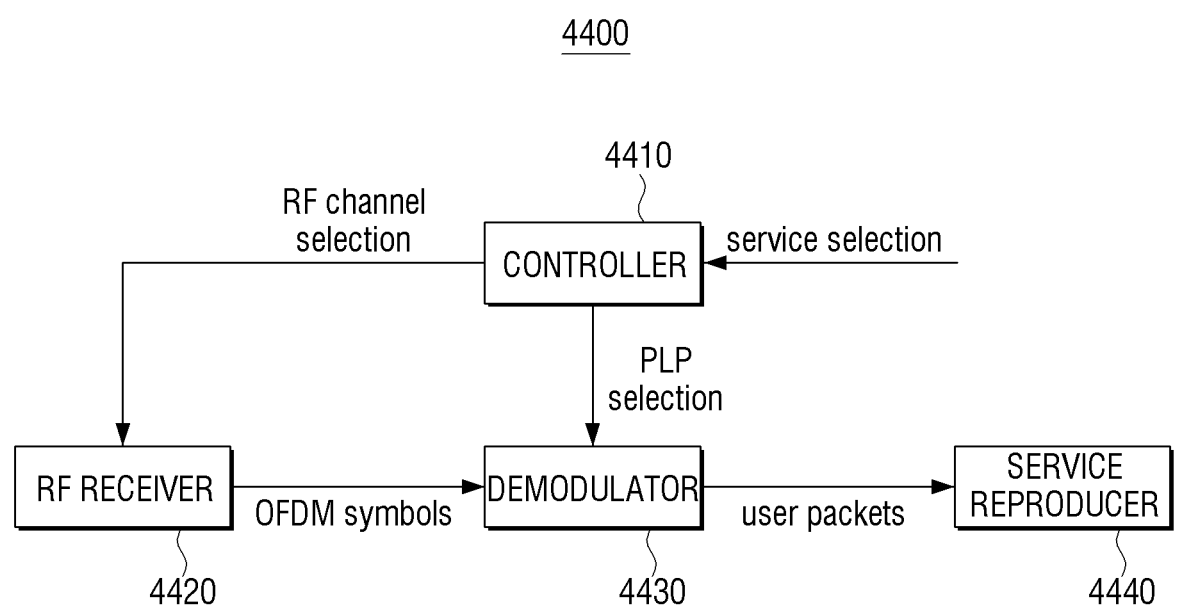
FIG. 27 is a block diagram illustrating a configuration of a receiver, according to an exemplary embodiment.

FIG. 27 is a block diagram of a receiving apparatus according to an exemplary embodiment.

Referring to FIG. 27, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation and equalization. Information required for the signal processing is predetermined between a transmitting apparatus and the receiving apparatuses or transmitted to the receiving apparatus in a predetermined OFDM symbols among the OFDM symbols.

The demodulator 4430 extracts a user packet by performing signal processing of the OFDM symbols, and delivers to the service player 4440. The service player 4440 plays and outputs the service selected by a user with the user packet. A format of the user packet may be different according to implementing services. For example, a TS packet or an IPv4 packet may be the user packet.

Figure 28:
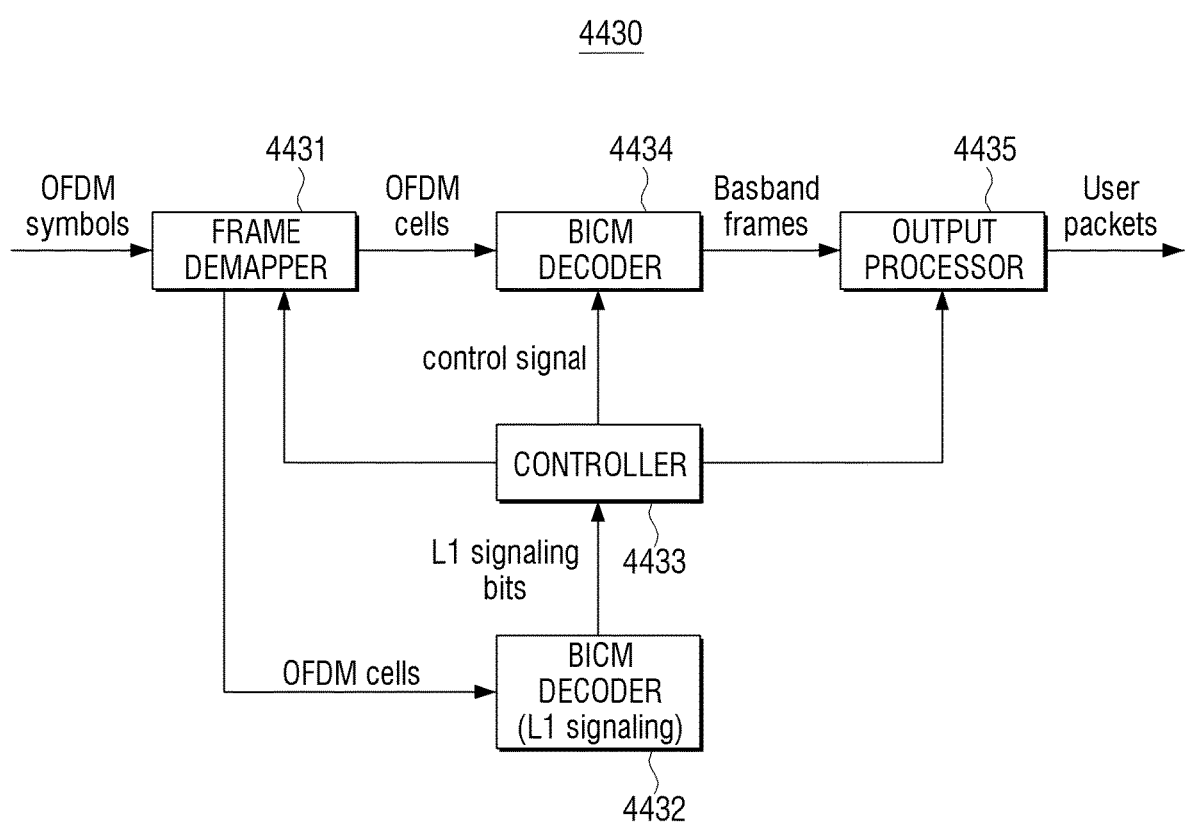
FIG. 28 is a block diagram illustrating a demodulator, according to an exemplary embodiment in more detail.

FIG. 28 is a block diagram describing the demodulator of FIG. 27 according to an exemplary embodiment.

Referring to FIG. 28, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers to the decoder 4434. Further, the frame demapper 4431 selects OFDM cells corresponding to more than one FEC block included in the L1 signaling, and delivers to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers to the controller 4433. In this case, the signal processing may include extracting log-likelihood ratio (LLR) values for decoding low density parity check (LDPC) codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 37 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

Meanwhile, according to an exemplary embodiment, the output processor 1235 may include an ALP packet processor (not illustrated) which extracts an ALP packet from a baseband packet.

Figure 29:
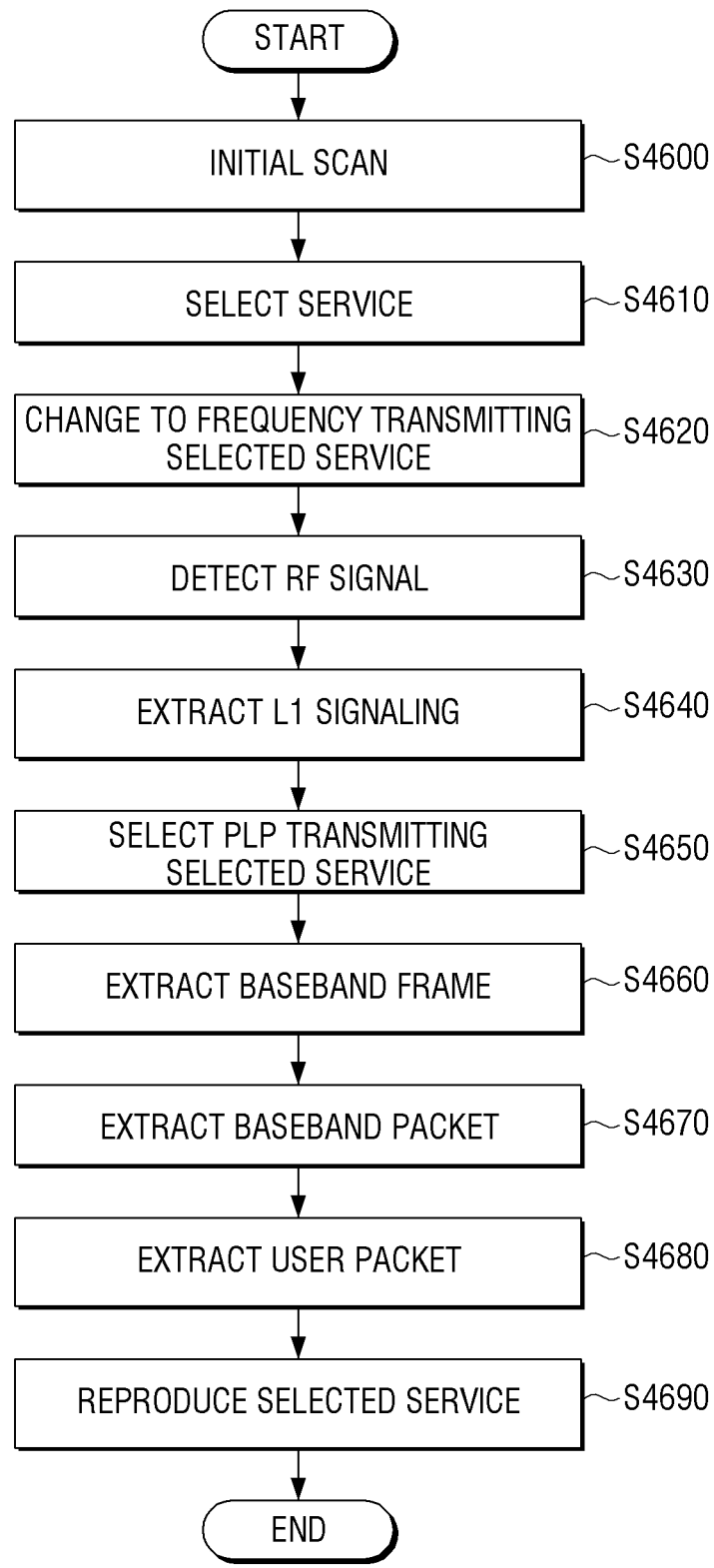
FIG. 29 is a flowchart schematically illustrating an operation of a receiver, according to an exemplary embodiment.

FIG. 29 is a flowchart provided to briefly explain an operation of a receiving apparatus from a time point when a user selects a service to a time point when the selected service is played.

It is assumed that service information about all the services that can be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects the PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S1690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer and data processing efficiency may be improved.

FIG. 30 is a flowchart illustrating a controlling method of a transmitting apparatus according to an exemplary embodiment.

In the controlling method of the transmitting apparatus illustrated in FIG. 30, a packet including a header and a payload is generated based on an input packet (S3510).

In addition, the generated packet is signal-processed (S3520).

Thereafter, the signal-processed packet is transmitted (S3530).

Here, the base field configuring the header includes a first field set as a first value representing that the base field is a first length or a second value representing that the base field is a second length, and when the first field is set as the second value, the base field may include a second field representing LSB of a pointer value representing a first value among respective start points of the input packets included in the payload and a third field representing MSB of the point value.

Further, when the first field, the second field, and the third field are included in the base field configuring the header, the base field may include a fourth field representing an extension mode of the header.

Further, the fourth field may include at least one of information about whether the optional field is present, a length of the optional field, and a structure of the extension field.

Further, the fourth field may be set to one of a third value representing that the optional field and the extension field are not present, a fourth value representing that the optional field is present and a length of the optional field is 1 byte, a fifth value representing that the optional field is present and the length of the optional field is 2 bytes, and a sixth value representing the optional field is present, the length of the optional field is 2 bytes, and the extension field has a structure to include a plurality of extension payloads.

Further, when the first field is set to the fourth value or the fifth value, the optional field further includes a fifth field representing a type of the extension payload included in the extension field and a sixth field representing the length of the extension field, and when the fifth field is set to the predetermined value, the extension field may be completely filled by padding.

Further, when the fourth field is set to the fifth value, the optional field may include a field representing a type of extension payload included in the extension field, a field representing an LSB part of the length of the extension field, and a field representing an MSB part of the length of the extension field.

Further, when the fourth field is set to the sixth value, the optional field may include a field representing the number of a plurality of extension payloads included in the extension field, a field representing an LSB part of the length of the extension field, and a field representing an MSB part of the length of the extension field.

Here, the extension field may include a plurality of field representing respective types of the plurality of extension payloads and a plurality of fields representing respective lengths of the plurality of extension payloads.

Further, the extension field may include an extension payload and the remaining part may include padding, when the fourth field is set to one of the fourth value and the fifth value and the length of the extension payload included in the extension field is smaller than the length of the extension field.

Further, the extension field may include a plurality of extension payloads and the remaining part may include padding when the fourth field is set to the sixth value.

Meanwhile, in a controlling method of the transmitting apparatus according to another exemplary embodiment, a packet including a header including a base header in which information about a start point of a data packet in a payload and information about whether an additional field is present are included, and the payload is generated.

Here, the information about the start point of the data packet may include information about whether an MSB part is present according to a distance between the start point of the payload and the start point of the data packet.

Further, the information about the start point of the data packet may include one of a first value representing that the MSB part is not present and a second value representing that the MSB part is present.

Further, the information about whether the additional field is present may include information representing whether at least one of the optional field and the extension field is present and the length of the optional field and the extension field.

Here, the optional field may include information representing whether at least one of the optional field and the extension field includes padding.

Further, the information about whether the additional field is present may include one of a first value representing that the optional field and the extension field are not present, a second value representing that the optional field is present, the extension field is not present, and a length of the optional field is 1 byte, a third value representing that the optional field is present, the extension field is not present, and the length of the optional field is 2 bytes, and a fourth value representing that the optional field and the extension field are present and the length of the optional field and the extension field exceeds 2 bytes.

Further, the optional field may include information representing the length of the extension field when the information about whether the additional field is present is set to the fourth value.

Further, the information representing the length of the extension field may include at least one of the LSB part and the MSB part according to the length of the extension field.

In addition, the generated frame is signal-processed.

Thereafter, the signal-processed frame is transmitted.

Meanwhile, FIG. 31 is a flowchart for describing a controlling method of a receiving apparatus according to an exemplary embodiment.

In the controlling method of the receiving apparatus illustrated in FIG. 31, a stream including a packet including a header and a payload is received (S3610).

In addition, the header is extracted from the packet and information included in the header is extracted (S3620).

Thereafter, an input packet included in the payload is signal-processed based on the extracted information (S3630).

Here, the base field configuring the header includes a first field set as a first value representing that the base field is a first length or a second value representing that the base field is a second length, and when the first field is set as the second value, the base field may include a second field representing LSB of a pointer value representing a first value among respective start points of the input packets included in the payload and a third field representing MSB of the point value.

Meanwhile, in a controlling method of a receiving apparatus according to another exemplary embodiment, a stream including a packet in which a header and a payload are included is received.

In addition, the header is extracted from the packet, and information representing a start point of a data packet in the payload and information about whether an additional field is present are extracted from the extracted header.

In addition, the data packet included in the payload is signal-processed based on the information about the start point of the extracted data packet and the information about whether an additional field is present.

Here, the information about the start point of the data packet may include information about whether an MSB part is present according to a distance between the start point of the payload and the start point of the data packet.

Further, the information about whether the additional field is present may include information about whether at least one of the optional field and the extension field is present and the length of the optional field and the extension field.

Further, the optional field may include information about whether at least one of the optional field and the extension field includes a padding.

As described above, according to the exemplary embodiments, various types of data can be mapped to a transmittable physical layer and data processing efficiency can be improved.

Meanwhile, a non-transitory computer readable medium in which programs sequentially performing the signal processing method according to the above exemplary embodiments are stored may be provided.

As an example, a non-transitory computer readable medium in which programs performing generating a packet including a header and a payload based on at least one input packet, signal-processing the generated packet, and transmitting the signal-processed packet are stored may be provided.

Further, as an example, a non-transitory computer readable medium in which programs performing receiving a stream including a packet including a header and a payload, extracting the header from the packet and extracting information included in the header, and signal-processing an input packet included in the payload based on the extracted information are stored may be provided.

The non-transitory computer readable medium means a medium which semi-permanently stores the data and is readable by a corresponding apparatus, but a medium which stores the data for a short time, such as a register, a cache, and a memory. In detail, various aforementioned applications or programs may be stored and provided in the non-transitory computer readable medium such as a compact disc (CD), a digital versatile disk (DVD), a hard disk, a Blu-ray disk, a universal serial bus (USB), a memory card, and a read-only memory (ROM) not being limited thereto.

At least one of the components, elements, modules or units represented by a block as illustrated in the drawings such as FIGS. 6, 7A, 8, 26A, 26B, 27 and 28 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Meanwhile, the detailed exemplary embodiments have been described thus far, but various modifications can be made without departing from the scope of the inventive concept. Therefore, the inventive concept should not be limited to the exemplary embodiment and should be defined by the appended claims and equivalents to the appended claims.

What is claimed is:

1. A receiving apparatus comprising:
   a receiver configured to receive a packet comprising a header and a payload; and
   a processor configured to process the received packet,
   wherein the header comprises a first field and a second field,
   wherein the first field comprises one of a first value or a second value,
   wherein the first value indicates that a length of the second field is a first length, and the second value indicates that the length of the second field is a second length,
   wherein, if the first field comprises the first value, the second field is represented as a pointer field, and if the first field comprises the second value, the second field is a concatenation of the pointer field and an added pointer field,
   wherein the second field comprises a pointer value,
   wherein the pointer value is an offset from a beginning of the payload to a first start position of at least one input packet that begins in the payload,
   wherein if the first field comprises the second value, the header comprises a third field including one of a third value, a fourth value and a fifth value,
   wherein the third value indicates absence of a fourth field and a fifth field in the packet,
   wherein the fourth value indicates presence of the fourth field of which a length is 1 byte,
   wherein the fifth value indicates presence of the fourth field of which the length is 2 bytes, wherein the fourth field comprises length information indicating a length of the fifth field, and wherein if the third field comprises the fifth value, the fourth field comprises least significant bits LSB and most significant bits MSB.

2. The receiving apparatus of claim 1, wherein if the third field comprises the fourth value or the fifth value, the fourth field comprises a sixth field indicating a type of the fifth field.

3. The receiving apparatus of claim 2, wherein the sixth field comprises a value indicating counter type or a value indicating all padding type.

4. The receiving apparatus claim 3, wherein if the sixth field comprises the value indicating all padding type and the third field comprises a value indicating that the length of the fifth field is 0 byte, the third field is used as padding.

5. The receiving apparatus of claim 4, wherein if the third field comprises the fourth value, the third field is used as padding of 1 byte, and wherein if the third field comprises the fifth value, the third field is used as padding of 2 bytes.

6. The receiving apparatus of claim 2, wherein the third field comprises one of the third value, the fourth value, the fifth value and a sixth value, and wherein if the third field comprises the sixth value, the fourth field comprises a seventh field indicating number of non-padding extensions in the fifth field.

7. A transmitting apparatus comprising:

a processor configured to generate a packet comprising a header and a payload, and generate a frame comprising the generated packet and signaling information; and a transmitter configured to transmit the generated frame, wherein the header comprises a first field and a second field, wherein the first field comprises one of a first value or a second value, wherein the first value indicates that a length of the second field is a first length, and the second value indicates that the length of the second field is a second length, and wherein, if the first field comprises the first value, the second field is represented as a pointer field, and if the first field comprises the second value, the second field is a concatenation of the pointer field and an added pointer field, wherein the second field comprises a pointer value, wherein the pointer value is an offset from a beginning of the payload to a first start position of at least one input packet that begins in the payload, wherein if the first field comprises the second value, the header comprises a third field including one of a third value, a fourth value and a fifth value, wherein the third value indicates absence of a fourth field and a fifth field in the packet, wherein the fourth value indicates presence of the fourth field of which a length is 1 byte, wherein the fifth value indicates presence of the fourth field of which the length is 2 bytes, wherein the fourth field comprises length information indicating a length of the fifth field, and wherein if the third field comprises the fifth value, the fourth field comprises least significant bits LSB and most significant bits MSB.

8. The transmitting apparatus of claim 7, wherein if the third field comprises the fourth value or the fifth value, the fourth field comprises a sixth field indicating a type of the fifth field.

9. The transmitting apparatus of claim 8, wherein the sixth field comprises a value indicating counter type or a value indicating all padding type.

10. The transmitting apparatus claim 9, wherein if the sixth field comprises the value indicating all padding type and the third field comprises a value indicating that the length of the fifth field is 0 byte, the third field is used as padding.

11. The transmitting apparatus of claim 10, wherein if the third field comprises the fourth value, the third field is used as padding of 1 byte, and wherein if the third field comprises the fifth value, the third field is used as padding of 2 bytes.

12. The transmitting apparatus of claim 8, wherein the third field comprises one of the third value, the fourth value, the fifth value and a sixth value, and wherein if the third field comprises the sixth value, the fourth field comprises a seventh field indicating number of non-padding extensions in the fifth field.

* * * * *